US011331755B2

(12) United States Patent
Hattori et al.

(10) Patent No.: US 11,331,755 B2
(45) Date of Patent: May 17, 2022

(54) ADDITIVE MANUFACTURING APPARATUS AND NUMERICAL CONTROL DEVICE

(71) Applicant: Mitsubishi Electric Corporation, Tokyo (JP)

(72) Inventors: Satoshi Hattori, Tokyo (JP); Takashi Hashimoto, Tokyo (JP); Nobuyuki Sumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/283,020

(22) PCT Filed: Oct. 24, 2018

(86) PCT No.: PCT/JP2018/039544
§ 371 (c)(1),
(2) Date: Apr. 6, 2021

(87) PCT Pub. No.: WO2020/084716
PCT Pub. Date: Apr. 30, 2020

(65) Prior Publication Data
US 2021/0308794 A1    Oct. 7, 2021

(51) Int. Cl.
*B23K 26/34* (2014.01)
*B33Y 30/00* (2015.01)
*B33Y 50/02* (2015.01)

(52) U.S. Cl.
CPC .............. *B23K 26/34* (2013.01); *B33Y 30/00* (2014.12); *B33Y 50/02* (2014.12)

(58) Field of Classification Search
CPC ......... B33Y 30/00; B33Y 10/00; B33Y 50/02; B33Y 70/00; B33Y 40/20; B33Y 50/00; B23K 26/34
(Continued)

(56) References Cited

U.S. PATENT DOCUMENTS 4,441,012 A    4/1984   Risbeck et al.
9,808,886 B2 *  11/2017  Peters ................ B23K 26/1423
(Continued)

FOREIGN PATENT DOCUMENTS

JP      58-122182 A    7/1983
JP       2-92479 A     4/1990
(Continued)

OTHER PUBLICATIONS

International Search Report and Written Opinion dated Jan. 8, 2019, received for PCT Application PCT/JP2018/039544, Filed on Oct. 24, 2018, 10 pages including English Translation.
Notice of Reasons for Refusal dated Oct. 1, 2019, received for JP Application 2019-524471, 11 pages including English Translation.
Decision to Grant dated Feb. 12, 2020, received for JP Application 2019-524471, 5 pages including English Translation.

*Primary Examiner* — Ibrahime A Abraham
*Assistant Examiner* — Chris Q Liu
(74) *Attorney, Agent, or Firm* — Xsensus LLP

(57) ABSTRACT

An additive manufacturing apparatus includes a laser oscillator that is a beam source that outputs a beam, and a rotary motor that is a driving unit that changes the relative positions of a material fed from a wire spool that is a supply source of a wire that is the material and an object to be machined. The driving unit is capable of performing first driving for feeding the material from the supply source toward the object to be machined and second driving for pulling back the fed material to the supply source, and switches from the first driving to the second driving on the basis of a machining program.

9 Claims, 11 Drawing Sheets

(58) Field of Classification Search
USPC ...... 219/121.65, 130.1, 130.51, 146.1, 76.14
See application file for complete search history.

(56) References Cited

U.S. PATENT DOCUMENTS

| | | | | |
|---|---|---|---|---|
| 9,833,862 | B2* | 12/2017 | Denney | B23K 26/211 |
| 9,839,978 | B2* | 12/2017 | Narayanan | B23K 26/34 |
| 2014/0021183 | A1* | 1/2014 | Peters | B23K 9/173 |
| | | | | 219/130.51 |
| 2014/0291886 | A1 | 10/2014 | Mark et al. | |
| 2015/0084222 | A1* | 3/2015 | Heston | B29C 48/92 |
| | | | | 425/166 |
| 2015/0209913 | A1* | 7/2015 | Denney | B23K 9/173 |
| | | | | 219/76.14 |
| 2017/0189982 | A1* | 7/2017 | Hsu | B23K 9/173 |
| 2018/0339457 | A1* | 11/2018 | Fujimaki | B29C 64/20 |
| 2019/0351509 | A1* | 11/2019 | Kay | B23K 9/04 |

FOREIGN PATENT DOCUMENTS

| | | | | |
|---|---|---|---|---|
| JP | 9-10982 A | 1/1997 | | |
| JP | 2001-105163 A | 4/2001 | | |
| JP | 2016-518267 A | 6/2016 | | |
| JP | 2016-179501 A | 10/2016 | | |
| JP | 2016-190426 A | 11/2016 | | |
| WO | WO-2017180116 A1 * | 10/2017 | ............. | B23K 26/03 |

\* cited by examiner

ADDITIVE MANUFACTURING APPARATUS AND NUMERICAL CONTROL DEVICE

CROSS-REFERENCE TO RELATED APPLICATION

The present application is based on PCT filing PCT/JP2018/039544, filed Oct. 24, 2018, the entire contents of which are incorporated herein by reference.

FIELD

The present invention relates to an additive manufacturing apparatus for manufacturing modeled objects by applying materials to objects to be machined, and a numerical control device for controlling the additive manufacturing apparatus.

BACKGROUND

Additive manufacturing apparatuses for manufacturing modeled objects having solid shapes by the direct energy deposition (DED) technology are known. Some additive manufacturing apparatuses manufacture modeled objects by locally melting a material using a beam emitted from a machining head and applying the molten material to an object to be machined.

An additive manufacturing apparatus which uses a wire made of metal as the material, forms linear beads which are solidification results of a molten metal material by moving the irradiation position of the beam while supplying the wire to the irradiation position. At an end portion where the formation of a bead is stopped, the additive manufacturing apparatus retracts the wire from the object being machined while the material is in the molten state before the wire adheres to the bead.

Patent Literature 1 discloses a method for welding a metal material by irradiating the metal material with laser light while supplying a wire to the metal material, in which the focus of the laser light is moved away from the welded part while gradually lowering the wire supply rate before stopping the irradiation with the laser light, at an end portion of the welded part.

CITATION LIST

Patent Literature

Patent Literature 1: Japanese Patent Application Laid-open No. 2001-105163

SUMMARY

Technical Problem

In a case where the focus is moved away from the end portion before stopping the beam in the additive manufacturing apparatus in a manner similar to the technology of the related art according to Patent Literature 1, irradiation to the leading end of the wire with the beam continues even while the formation of a bead is stopped and the wire supply rate is being lowered. At the leading end, the wire is molten by the irradiation with the beam, and the molten wire is solidified thereafter. Through such melting and solidification, a lump having a width larger than that of the wire other than the leading end may be formed at the leading end. When such a lump is formed on the wire, the next application is started by using the wire with the lump remaining thereon, which may affect the shape of the modeled object. If the lump is cut off from the wire after the application is stopped and before the application is started, the processes needed for the additive manufacturing apparatus to manufacture modeled objects will increase, and there will also be a problem in that cut lumps remain in the additive manufacturing apparatus. With the technology of the related art, the additive manufacturing apparatus can reduce adhesion of the wire to the bead, but has a problem in that the machining quality lowers by formation of a lump at the leading end of the wire.

The present invention has been made in view of the above, and an object thereof is to provide an additive manufacturing apparatus capable of improving machining quality.

Solution to Problem

An additive manufacturing apparatus according to an aspect of the present invention manufactures a modeled object by applying a material molten by irradiation with a beam to an object to be machined. An additive manufacturing apparatus according to the present invention includes a beam source that outputs a beam, and a driving unit that changes relative positions of a material fed from a supply source of the material and an object to be machined. The driving unit is capable of performing first driving for feeding the material from the supply source toward the object to be machined and second driving for pulling back the fed material to the supply source, and switches from the first driving to the second driving on the basis of a machining program.

Advantageous Effects of Invention

An additive manufacturing apparatus according to the present invention produces an effect of enabling improvement in machining quality.

DESCRIPTION OF EMBODIMENTS

An additive manufacturing apparatus and a numerical control device according to certain embodiments of the present invention will be described in detail below with reference to the drawings. Note that the present invention is not limited to the embodiments. In the following description, the numerical control device may be referred to as a numerical control (NC) device.

First Embodiment

Figure 1:
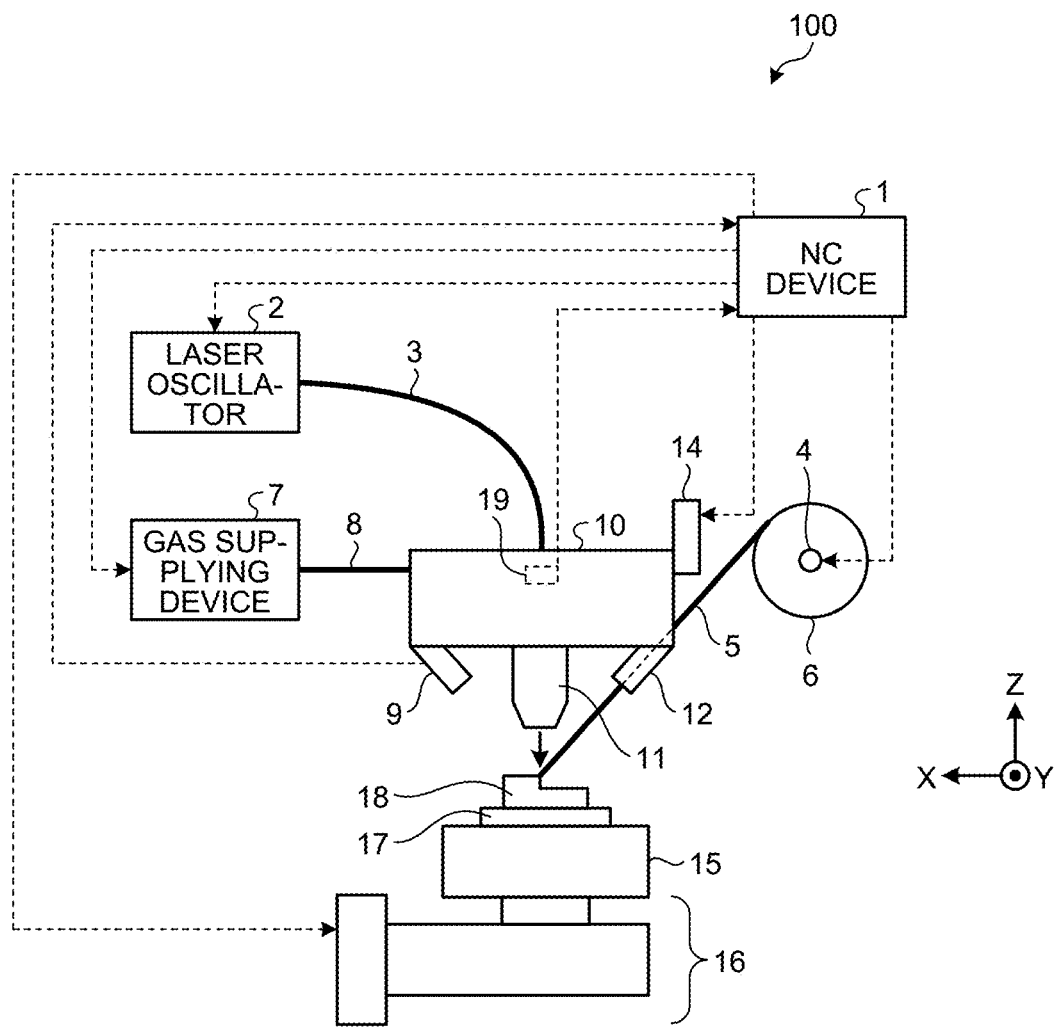
FIG. 1 is a diagram illustrating an additive manufacturing apparatus according to a first embodiment of the present invention.

FIG. 1 is a diagram illustrating an additive manufacturing apparatus 100 according to a first embodiment of the present invention. The additive manufacturing apparatus 100 is a machine tool for manufacturing modeled objects by additive machining, which is application of a material molten by beam irradiation to an object to be machined. In the first embodiment, the beam is a laser beam, and the material is a wire 5, which is a metal material.

The additive manufacturing apparatus 100 forms deposits 18 of the metal material on the surface of a base material 17 by depositing beads on the base material 17. The beads are linear objects formed by solidification of the molten wire 5. The base material 17 is placed on a stage 15. In the following description, the object to be machined refers to the base material 17 and the deposits 18. The modeled object refers to the base material 17 and the deposits 18 after application of materials according to a machining program is finished. The base material 17 illustrated in FIG. 1 is a plate. The base material 17 may be a material other than a plate.

The additive manufacturing apparatus 100 includes a machining head 10 with a beam nozzle 11, a wire nozzle 12, and a gas nozzle. The beam nozzle 11 emits a laser beam for melting a material toward the object to be machined. The wire nozzle 12 advances the wire 5 toward the laser beam irradiation position on the object to be machined. The gas nozzle produces a jet of gas for inhibiting the oxidation of the deposits 18 and cooling the beads toward the object to be machined. In FIG. 1, the gas nozzle is not illustrated. The machining head 10 also includes a temperature sensor 9, and a camera 19.

A laser oscillator 2, which is a beam source, emits an oscillating laser beam. The laser beam from the laser oscillator 2 is propagated to the beam nozzle 11 via a fiber cable 3, which is an optical transmission path. A gas supplying device 7 supplies gas to the gas nozzle via piping 8. The gas nozzle produces a jet of gas along the central axis of the laser beam emitted from the beam nozzle 11. Thus, the beam nozzle 11 and the gas nozzle are arranged coaxially. Alternatively, the gas nozzle may be disposed at a position other than a position coaxial with the beam nozzle 11.

A wire spool 6 around which the wire 5 is wound is a material supply source. A rotary motor 4 is a supply driving unit for supply of the material. The wire spool 6 rotates with rotational driving of the rotary motor 4, which is a servomotor. The rotary motor 4 performs first driving for feeding the wire 5 toward the object to be machined from the wire spool 6, and second driving for pulling back the fed wire 5 toward the wire spool 6. The rotary motor 4 rotates the wire spool 6 in a first direction by the first driving, and rotates the wire spool 6 in a second direction, which is opposite the first direction, by the second driving. In FIG. 1, the first direction is the counterclockwise direction, and the second direction is the clockwise direction. The rotary motor 4 switches from the first driving to the second driving on the basis of a machining program. The rotary motor 4 changes the relative positions of a leading end of the wire 5 fed from the wire spool 6 and the object to be machined by switching from the first driving to the second driving.

The wire 5 fed from the wire spool 6 passes through the wire nozzle 12 and supplied to the irradiation position of the laser beam. Note that the wire nozzle 12 may be provided with an operation mechanism for pulling out the wire 5 from the wire spool 6. The additive manufacturing apparatus 100 is provided with at least one of the rotary motor 4 coupled to the wire spool 6 and the operation mechanism for the wire nozzle 12 in order to enable supply of the wire 5 to the irradiation position of the laser beam. Such an operation mechanism is a supply driving unit for supplying the material. In FIG. 1, the operation mechanism for the wire nozzle 12 is not illustrated.

A head driving unit 14 moves the machining head 10 in each of the X-axis direction, the Y-axis direction, and the Z-axis direction. The X axis, the Y axis, and the Z axis are three axes perpendicular to each other. The X axis and the Y axis are parallel to the horizontal direction. The Z-axis direction is the vertical direction. Note that the direction indicated by an arrow in FIG. 1 along the X-axis direction may be referred to as a plus X direction, and the direction opposite the plus X direction may be referred to as a minus X direction. Note that the direction indicated by an arrow in FIG. 1 along the Y-axis direction may be referred to as a plus Y direction, and the direction opposite the plus Y direction may be referred to as a minus Y direction. The direction indicated by an arrow in FIG. 1 along the Z-axis direction may be referred to as a plus Z direction, and the direction opposite the plus Z direction may be referred to as a minus Z direction. The plus Z direction is a vertically upward direction. The minus Z direction is a vertically downward direction.

The head driving unit 14 includes a servomotor constituting an operation mechanism for moving the machining head 10 in the X-axis direction, a servomotor constituting an operation mechanism for moving the machining head 10 in the Y-axis direction, and a servomotor constituting an operation mechanism for moving the machining head 10 in the Z-axis direction. The head driving unit 14 is an operation mechanism that enables translational movement in each of the directions of the three axes. In FIG. 1, the servomotors are not illustrated. The additive manufacturing apparatus 100 moves the irradiation position of the laser beam on the object to be machined by moving the machining head 10 by the driving of the head driving unit 14.

With the machining head 10 illustrated in FIG. 1, the laser beam is made to travel in the minus Z direction from the beam nozzle 11. The wire nozzle 12 is provided at a position away from the beam nozzle 11 in the XY plane, and advances the wire 5 in a direction at an angle to the Z axis. In addition, the machining head 10 may advance the wire 5 along the central axis of a laser beam emitted from the beam nozzle 11. Thus, the beam nozzle 11 and the wire nozzle 12 may be arranged coaxially. The beam nozzle 11 may emit a laser beam with a shape of the beam cross section adjusted to a ring shape around the wire 5, or a plurality of beams distributed around the wire 5. Such laser beams are adjusted so as to converge at the irradiation position on the object to be machined.

A rotational driving unit 16 is an operation mechanism that enables rotational movement about each of two axes. The rotational driving unit 16 includes a servomotor constituting an operation mechanism for rotating the stage 15 about the Z axis, and a servomotor constituting an operation mechanism for rotating the stage 15 about the X axis. In FIG. 1, the servomotors are not illustrated. The rotational driving unit 16 turns the object to be machined together with the stage 15. The additive manufacturing apparatus 100 is capable of making the posture of the object to be machined suitable for machining by turning the stage 15 by the rotational driving unit 16.

The temperature sensor 9 detects the temperature of the object to be machined including a molten pool in which a material molten on the object to be machined is stored. The camera 19 takes images of the molten pool. The additive manufacturing apparatus 100 adjusts a machining condition on the basis of a detection result from the temperature sensor 9. The additive manufacturing apparatus 100 can perform machining while monitoring the state of the molten pool on the basis of image data obtained by imaging by the camera 19.

An NC device 1 controls the additive manufacturing apparatus 100 in accordance with a machining program. The NC device 1 outputs an axis command to the head driving unit 14 to control the head driving unit 14. The NC device 1 outputs an output command to the laser oscillator 2 to control the laser oscillation of the laser oscillator 2. The output command is a first command for controlling the laser beam output.

The NC device 1 outputs a supply command to the rotary motor 4 to control the rotary motor 4. The supply command is a second command for controlling the first driving and the second driving. The NC device 1 controls the first driving to adjust the velocity of the wire 5 fed from the wire spool 6 toward the object to be machined. In addition, the NC device 1 controls the second driving to adjust the velocity of the wire 5 pulled back from the object to be machined toward the wire spool 6. Such velocity may also be referred to as a travel velocity. The travel velocity when the wire 5 is fed from the wire spool 6 indicates the amount of supply of the material per hour.

The NC device 1 outputs a command according to the condition of the gas supply amount to the gas supplying device 7 to control the amount of gas supply from the gas supplying device 7 to the gas nozzle. The NC device 1 outputs a rotation command to the rotational driving unit 16 to control the driving of the rotational driving unit 16.

The temperature sensor 9 outputs a signal indicating a temperature detection result to the NC device 1. The camera 19 outputs image data obtained by the imaging to the NC device 1. The NC device 1 adjusts the machining condition on the basis of the temperature detection result and the image data. Note that the NC device 1 may be one of the components of the additive manufacturing apparatus 100 or a device external to the additive manufacturing apparatus 100.

Figure 2:
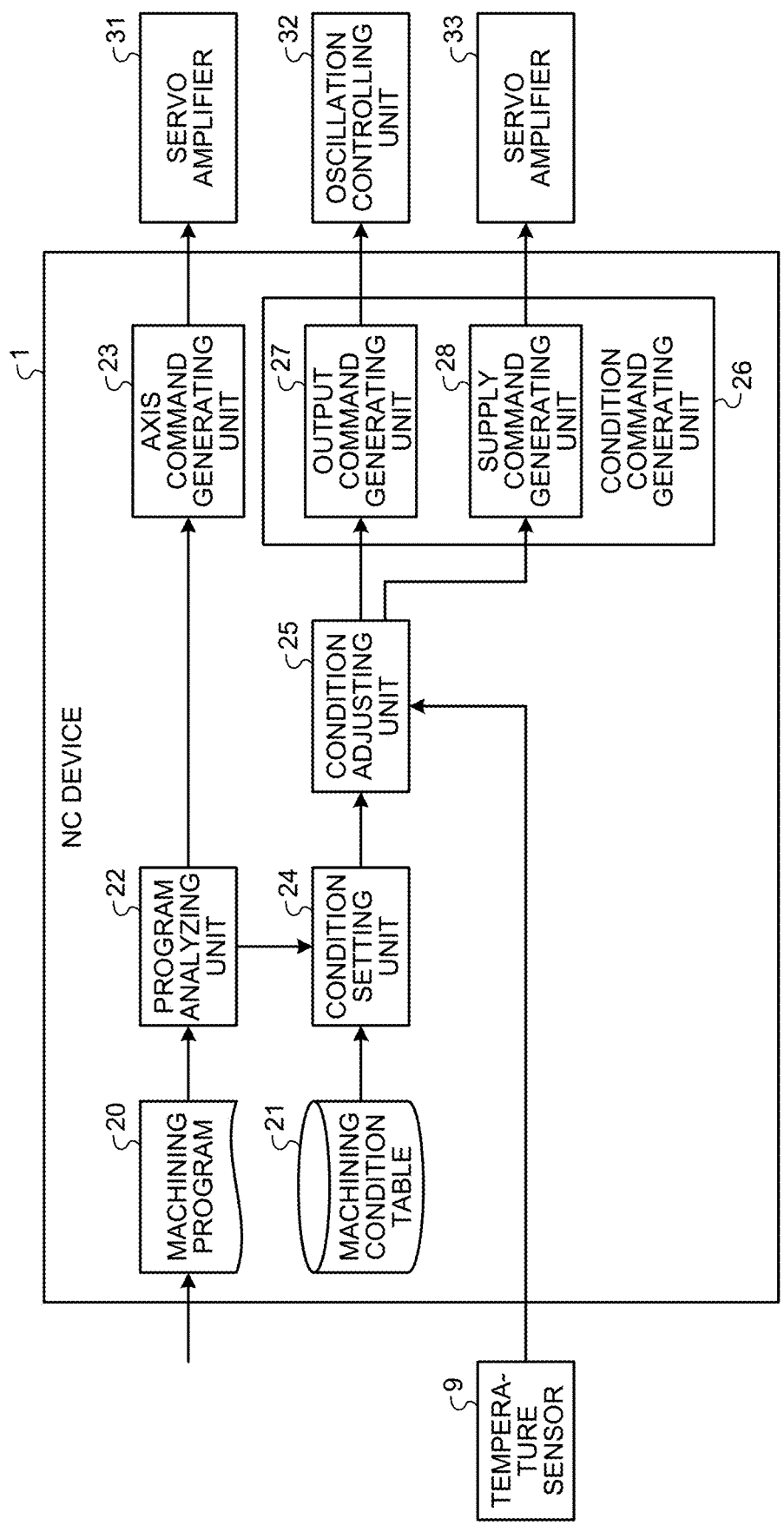
FIG. 2 is a diagram illustrating a functional configuration of an NC device that controls the additive manufacturing apparatus illustrated in FIG. 1.

FIG. 2 is a diagram illustrating a functional configuration of the NC device 1 that controls the additive manufacturing apparatus 100 illustrated in FIG. 1. A machining program 20, which is an NC program created by a computer aided manufacturing (CAM) device, is input to the NC device 1. The machining program 20 specifies a machining path, which is a path along which the irradiation position of the laser beam is moved, in accordance with an instruction of a moving path along which the machining head 10 is moved relative to the object to be machined placed on the stage 15.

The NC device 1 includes a machining condition table 21 in which data of various machining conditions are stored. The machining program 20 includes a command for selecting a machining condition from among the machining conditions of which data are stored in the machining condition table 21.

The NC device 1 includes a program analyzing unit 22 that analyzes the machining program 20, and an axis command generating unit 23 that generates an axis command on the basis of a result of analysis of the program analyzing unit 22. The program analyzing unit 22 analyzes a movement path along which the machining head 10 is to be moved on the basis of the contents of processes described in the machining program. The program analyzing unit 22 outputs data representing the analyzed movement path to the axis command generating unit 23. The axis command generating unit 23 generates an axis command, which is a group of interpolation points per unit time on the movement path.

The NC device 1 includes a condition setting unit 24 that sets a machining condition, a condition adjusting unit 25 that adjusts the machining condition, and a condition command generating unit 26 that generates a command in accordance with the machining condition. The program analyzing unit 22 obtains information for specifying a machining condition from the machining program 20, and outputs the obtained information to the condition setting unit 24. The condition setting unit 24 reads data of the machining condition specified in the machining program 20 from the machining condition table 21 on the basis of the information from the program analyzing unit 22. In this manner, the condition setting unit 24 sets a machining condition for additive machining. Note that the NC device 1 may also obtain data of a machining condition on the basis of the machining program 20 in which data of the machining condition are described, instead of obtaining the data of a specified machining condition from among the data of various machining conditions stored in the advance in the machining condition table 21. In this case as well, the program analyzing unit 22 can obtain the data of the machining condition by analyzing the machining program 20. The program analyzing unit 22 outputs the obtained data of the machining condition to the condition adjusting unit 25.

The condition adjusting unit 25 obtains the data of the set machining condition from the condition setting unit 24 and adjusts the machining condition. The signal from the temperature sensor 9 is input to the condition adjusting unit 25. The condition adjusting unit 25 adjusts the laser beam output or the gas supply amount on the basis of the detection result from the temperature sensor 9. The condition adjusting unit 25 outputs data of the adjusted machining condition to the condition command generating unit 26.

The condition command generating unit 26 obtains the data of the machining condition from the condition adjusting unit 25, and generates various commands in accordance with the machining condition. The condition command generating unit 26 includes an output command generating unit 27 that generates an output command for controlling the laser beam output, and a supply command generating unit 28 that generates a supply command for controlling the supply of the wire 5. The supply command generating unit 28 generates a supply command that changes the relative positions of the leading end of the wire 5 fed from the wire spool 6 and the object to be machined. The NC device 1 generates the axis command generated by the axis command generating unit 23, the output command generated by the output command generating unit 27, and the supply command generated by the supply command generating unit 28.

The head driving unit 14 illustrated in FIG. 1 includes a servo amplifier 31 for controlling the driving of each of the servomotors included in the head driving unit 14. The servo amplifier 31 controls the driving of each of the servomotors in accordance with the axis command output from the NC device 1.

The laser oscillator 2 illustrated in FIG. 1 includes an oscillation controlling unit 32 that controls the laser oscillation. The oscillation controlling unit 32 controls the laser oscillation in accordance with the output command output from the NC device 1. The rotary motor 4 illustrated in FIG. 1 includes a servo amplifier 33 that controls the rotating operation. The servo amplifier 33 controls the driving of the rotary motor 4 in accordance with the supply command output from the NC device 1.

In addition, the condition command generating unit 26 outputs a command according to the condition of the gas supply amount to the gas supplying device 7. The axis command generating unit 23 outputs a rotation command to the rotational driving unit 16. In FIG. 2, output of a command to the gas supplying device 7 and output of a rotation command to the rotational driving unit 16 are not illustrated. The NC device 1 controls the entire additive manufacturing apparatus 100 by outputting various commands.

The NC device 1 may perform adjustment of the axis command generated by the axis command generating unit 23 or adjustment of the machining condition by the condition adjusting unit 25 on the basis of the image data obtained by the camera 19. In FIG. 2, input of image data from the camera 19 to the NC device 1 is not illustrated.

Next, a hardware configuration of the NC device 1 will be described. The respective functional units of the NC device 1 illustrated in FIG. 2 are implemented by a control program, which is a program for performing a method for controlling the additive manufacturing apparatus 100 of the first embodiment, being executed with use of hardware.

Figure 3:
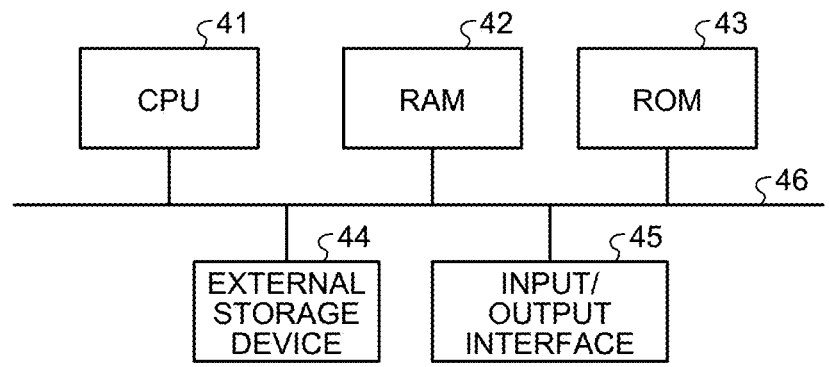
FIG. 3 is a block diagram illustrating a hardware configuration of the NC device according to the first embodiment.

FIG. 3 is a block diagram illustrating a hardware configuration of the NC device 1 according to the first embodiment. The NC device 1 includes a central processing unit (CPU) 41 that performs various processes, a random access memory (RAM) 42 including a data storage area, a read only memory (ROM) 43, which is a nonvolatile memory, an external storage device 44, and an input/output interface 45 for inputting information to the NC device 1 and outputting information from the NC device 1. The respective components illustrated in FIG. 3 are connected with each other via a bus 46.

The CPU 41 executes programs stored in the ROM 43 and the external storage device 44. The program analyzing unit 22, the axis command generating unit 23, the condition setting unit 24, the condition adjusting unit 25, the condition command generating unit 26, the output command generating unit 27, and the supply command generating unit 28 illustrated in FIG. 2 are implemented with use of the CPU 41.

The external storage device 44 is a hard disk drive (HDD) or a solid state drive (SSD). The external storage device 44 stores the control programs and various data. The external storage device 44 stores the machining program 20 and the machining condition table 21 illustrated in FIG. 2. The ROM 43 stores software or a program for controlling hardware, which is a basic input/output system (BIOS) that is a basic program for controlling a computer or a controller that is the NC device 1 or a boot loader such as a unified extensible firmware interface (UEFI). Note that the control programs may be stored in the ROM 43.

The programs stored in the ROM 43 and the external storage device 44 are loaded into the RAM 42. The CPU 41 loads the control programs in the RAM 42 to perform various processes. The input/output interface 45 is an interface for connection with devices external to the NC device 1. The machining program 20 and the data stored in the machining condition table 21 are input to the input/output interface 45. In addition, the input/output interface 45 outputs various commands. The NC device 1 may include an input device such as a keyboard or a pointing device, and an output device such as a display.

The control programs may be stored in a storage medium readable by a computer. The NC device 1 may store the control programs stored in a storage medium into the external storage device 44. The storage medium may be a portable storage medium, which is a flexible disk, or a flash memory, which is a semiconductor memory. The control programs may be installed into a computer or a controller that is the NC device 1, from another computer or a server via a communication network.

The functions of the NC device 1 may be implemented by processing circuity that is dedicated hardware for controlling the additive manufacturing apparatus 100. The processing circuity is a single circuit, a composite circuit, a programmed processor, a parallel-programmed processor, an application specific integrated circuit (ASIC), a field-programmable gate array (FPGA), or a combination thereof. Some of the functions of the NC device 1 may be implemented by dedicated hardware, and others may be implemented by software or firmware.

Figure 4:
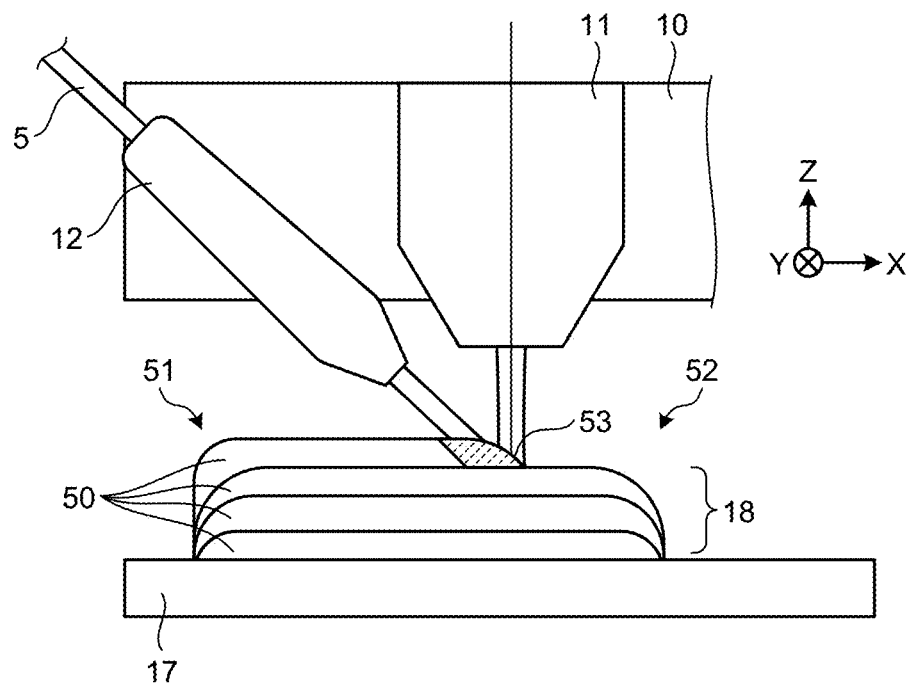
FIG. 4 is a diagram illustrating a state in which the additive manufacturing apparatus illustrated in FIG. 1 forms beads.

Next, formation of beads by the additive manufacturing apparatus 100 will be explained. FIG. 4 is a diagram illustrating a state in which the additive manufacturing apparatus 100 illustrated in FIG. 1 forms beads 50. The additive manufacturing apparatus 100 forms the beads 50 by moving the machining head 10 while supplying the wire 5 to the irradiation position of the laser beam. In the example illustrated in FIG. 4, the additive manufacturing apparatus 100 moves the machining head 10 in the plus X direction to form a bead 50 with its longitudinal direction in the X-axis direction. A bead 50 on a first layer is formed directly on the base material 17. A bead 50 on a second layer is formed on the bead 50 of the first layer. The additive manufacturing apparatus 100 causes to deposit a plurality of beads 50 to form the deposits 18.

Before starting the formation of the bead 50, the additive manufacturing apparatus 100 moves the machining head 10 to a position that is a start point 51 of the bead 50. The additive manufacturing apparatus 100 starts the movement of the machining head 10 in the X-axis direction from this position, the irradiation with the laser beam, and the feeding of the wire 5. The rotary motor 4 feeds the wire 5 from the wire spool 6 to the laser beam irradiation position on the base material 17 by the first driving. The additive manufacturing apparatus 100 forms the bead 50 by moving the machining head 10 with the irradiation with the laser beam and the feeding of the wire 5, and solidifying the molten pool 53 by a decrease in temperature.

When the irradiation position reaches a position that is an end point 52 of the bead 50, the additive manufacturing apparatus 100 stops the movement of the machining head 10, the irradiation with the laser beam, and the feeding of the wire 5. The additive manufacturing apparatus 100 forms one bead 50 in this manner. Upon ending the formation of the bead 50 at the end point 52, the additive manufacturing apparatus 100 rotates the wire spool 6 in the second direction by the rotary motor 4 to pull back the wire 5 to the wire spool 6.

Upon ending formation of one bead 50, the additive manufacturing apparatus 100 moves the machining head 10 to a position that is a start point 51 of a next bead 50. For forming a plurality of deposits 18 on the base material 17, the additive manufacturing apparatus 100 may form a next deposit 18 after ending formation of one deposit 18, or may form a plurality of deposits 18 concurrently. Forming a plurality of deposits 18 concurrently refers to forming a plurality of deposits 18 in such procedures as forming beads 50 on first layers of the respective deposits 18, and then forming beads 50 on second layers of the respective deposits 18.

Figure 5:
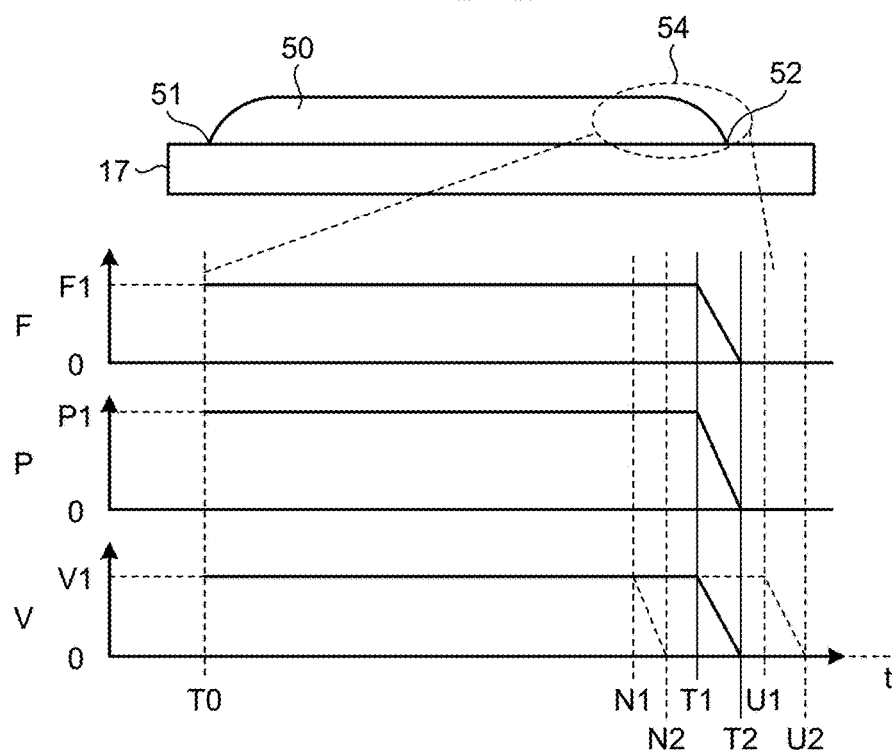
FIG. 5 is a diagram explaining a comparative example of the first embodiment.

Next operation around the end point 52 will be explained. Here, operation according to a comparative example will be explained before explanation of the operation of the additive manufacturing apparatus 100 according to the first embodiment. FIG. 5 is a diagram explaining the comparative example of the first embodiment. FIG. 5 illustrates changes in the velocity of the machining head 10, the laser beam output, and the velocity of the wire 5 when an end portion 54, which is a portion including the end point 52, of a bead 50 is formed. Among three graphs illustrated in FIG. 5, the vertical axis of a first graph represents the velocity F of the machining head 10, the vertical axis of a second graph represents the laser beam output P, and the vertical axis of a third graph represents the velocity V of the wire 5. The horizontal axis of each of the graphs represents time t.

F1 represents a velocity value of the machining head 10 specified by a velocity command in the machining program 20. P1 represents a laser beam output value in accordance with the machining condition. V1 represents a velocity value of the wire 5 in accordance with the machining condition. The machining head 10 reaches the end portion 54 at time T1. From time T0 to time T1, the velocity F is maintained at F1, the output P is maintained at P1, and the velocity V is maintained at V1.

At time T1, the additive manufacturing apparatus 100 starts deceleration of the machining head 10, lowering of the laser beam output, and deceleration of the wire 5. The machining head 10 reaches the end point 52 at time T2, and stops at the end point 52. At time T2, the output of the laser beam and the feeding of the wire 5 are stopped. Note that, in FIG. 5, the changes in the velocity V in pulling back the wire 5 after time T2 are not illustrated.

In such an example, assume that the deceleration of the wire 5 is started at time N1 before time T1 and that the feeding of the wire 5 is stopped at time N2 before time T1. In this case, from time N2 to time T2, the supply of the wire 5 to the irradiation position is stopped, and the leading end of the wire 5 is separated from the object being machined as the machining head 10 moves. Thus, adhesion of the beads 50 to the wire 5 can be reduced. Because irradiation of the wire 5 with the laser beam is continued even after the supply of the wire 5 is stopped; accordingly, the wire 5 is molten by the irradiation with the laser beam at the leading end of the wire 5, and the molten wire 5 is solidified thereafter. Such melting and solidification cause a lump at the leading end.

In addition, assume that the deceleration of the wire 5 is started at time U1 after time T2, and that the feeding of the wire 5 is stopped at time U2 after time T2. In this case, because the supply of the wire 5 is continued even after the irradiation with the laser beam is stopped and after the machining head 10 is stopped, the leading end of the wire 5 may adhere to the beads 50 as the molten pool 53 is solidified.

Furthermore, when the pulling-back of the wire 5 is started after the irradiation with the laser beam is stopped, the leading end 5a of the wire 5 may be pulled out of the molten pool 53 with the material that is almost solidified adhering to the leading end of the wire 5. In this case as well, solidification of the material at the leading end 5a causes a lump at the leading end of the wire 5.

As described above, a first cause of the formation of a lump on the wire 5 is that, when the pulling-back of the wire 5 is started after the irradiation with the laser beam is stopped, the material from the molten pool 53 adheres to the leading end of the wire 5. In addition, a second cause of the formation of a lump on the wire 5 is that, when the wire 5 is irradiated with the laser beam after the supply of the wire 5 is stopped, the wire 5 is molten at a position away from the beads 50. If the formation of a next bead 50 is started using the wire 5 with a lump thereon, the amount of supply of the material at the start point 51 is increased as compared with a case where no lump is formed, which may deteriorate the accuracy of the shape of the portion of the bead 50 including the start point 51. In the case of the first cause, part of the material forming the end portion 54 of the bead 50 will be removed from the end portion 54 together with the wire 5, which may deteriorate the accuracy of the shape of the end portion 54.

In a case where the wire 5 adheres to the bead 50, the wire 5 may be cut by being pulled when the wire 5 is pulled back or when the machining head 10 is moved thereafter. When the wire 5 is cut, the accuracy of the shape of the end portion 54 may be deteriorated. In addition, when the rotary motor 4 is driven with the wire 5 adhering to the bead 50, an excessive load may be applied to the rotary motor 4. When the head driving unit 14 is driven with the wire 5 adhering to the bead 50, an excessive load may be applied to the head driving unit 14.

A thermally balanced state between the wire 5 and the molten pool 53 when the velocity F is F1, the output P is P1, and the velocity V is V1 will be referred to as a steady state in the following description. Lowering the laser beam output with the deceleration of the machining head 10 from time T1 to time T2, can adjust the quantity of heat supplied at each position coordinate on a path of the irradiation position.

Even when the deceleration of the wire 5 is started at time T1 and the feeding of the wire 5 is stopped at time T2, the thermally balanced state between the wire 5 and the molten pool 53 may be changed from the steady state. Such a change may be caused by a change in the temperature of the object being machined. For example, as the beads 50 are deposited on the object being machined, the heat capacity of the object being machined and the thermal conductivity of the object being machined change, which changes the temperature of the object being machined. A change in the thermally balanced state may cause a lump to be formed. In addition, the wire 5 may adhere to the beads 50 due to change in the thermally balanced state. As described above, in the case of the comparative example, it is difficult to reduce the formation of a lump and the adhesion of the wire 5 even if the changes in the velocity F, the output P, and the velocity V during the formation of the end portion 54 are accurately controlled.

Next, operation performed by the additive manufacturing apparatus 100 according to the first embodiment will be explained. In the first embodiment, the rotary motor 4 switches from the first driving to the second driving at a third time point, which is a time point between a first time point when the output of the laser oscillator 2 is started to be lowered from P1 and a second time point when the output of the laser beam is stopped. The rotary motor 4 starts pulling back of the wire 5 from the object being machined at the third time point by switching the driving from the first driving to the second driving.

The output command generating unit 27, which is a first command generating unit, generates an output command for causing the laser oscillator 2 to start lowering the output from P1 at the first time point and causing the output of the laser beam to stop at the second time point on the basis of the machining program. The supply command generating unit 28, which is a second command generating unit, generates a supply command to for switching from the first driving to the second driving at the third time point, on the basis of the machining program. In other words, the supply command generating unit 28 generates a supply command for starting the pulling-back of the wire 5 toward the wire spool 6 at the third time point.

Figure 6:
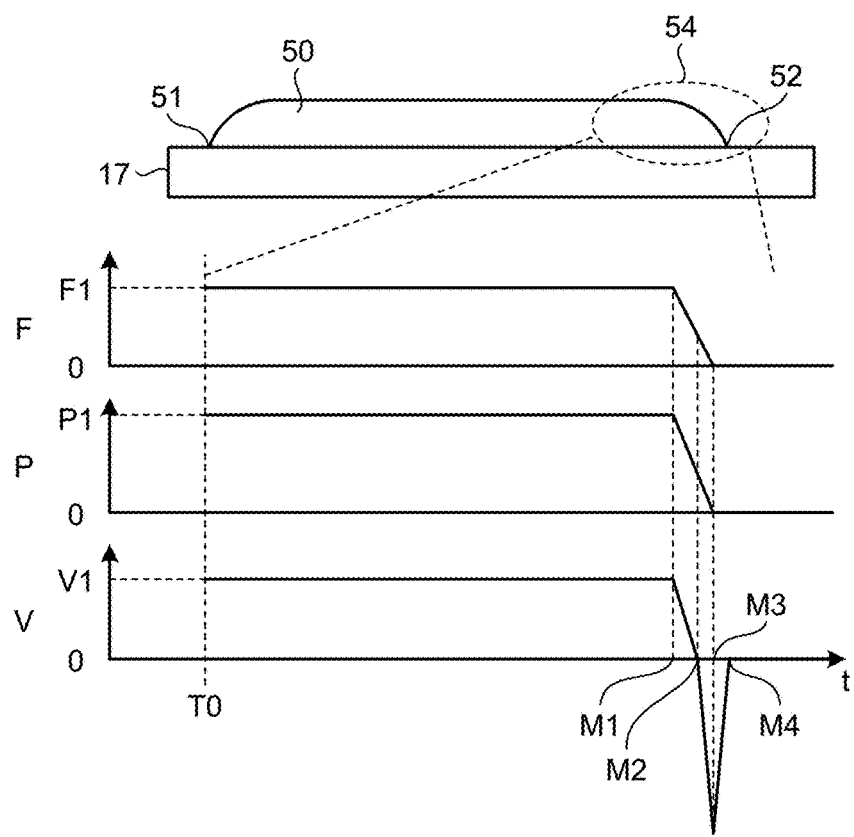
FIG. 6 is a diagram illustrating operation of the additive manufacturing apparatus according to the first embodiment.

FIG. 6 is a diagram illustrating operation of the additive manufacturing apparatus 100 according to the first embodiment. FIG. 6 illustrates changes in the velocity of the machining head 10, the laser beam output, and the velocity of the wire 5 when the end portion 54 of the bead 50 is formed. Among three graphs illustrated in FIG. 6, the vertical axis of a first graph represents the velocity F of the machining head 10, the vertical axis of a second graph represents the laser beam output P, and the vertical axis of a third graph represents the velocity V of the wire 5. The horizontal axis of each of the graphs represents time t.

From time T0 to time M1, the velocity F is maintained at F1, the output P is maintained at P1, and the velocity V is maintained at V1. At time M1, which is a first time point, the additive manufacturing apparatus 100 starts deceleration of the machining head 10, lowering of the laser beam output, and deceleration of the wire 5. The machining head 10 reaches the end point 52 at time M3, and stops at the end point 52. The laser beam output is stopped at time M3. The additive manufacturing apparatus 100 stops the feeding of the wire 5 at time M2 between time M1 and time M3. The additive manufacturing apparatus 100 also starts the pulling-back of the wire 5 at time M2. The velocity of the wire 5 while the wire 5 is pulled back is accelerated from time M2 and then decelerated. The pulling-back of the wire 5 stops at time M4 after time M3.

Figure 7:
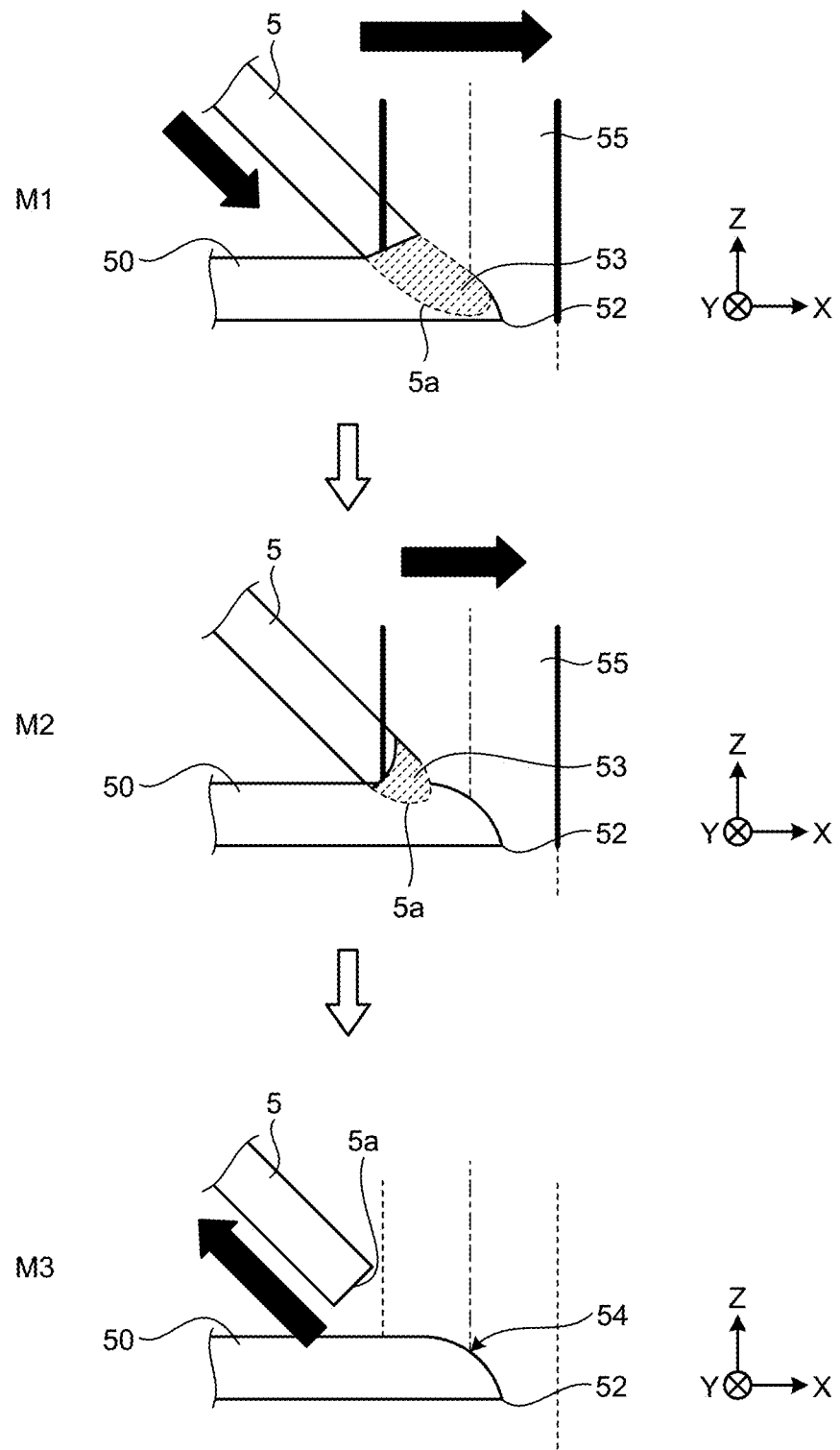
FIG. 7 is a diagram illustrating states of a laser beam and a wire in the additive manufacturing apparatus illustrated in FIG. 1.

FIG. 7 is a diagram illustrating the states of the laser beam 55 and the wire 5 in the additive manufacturing apparatus 100 illustrated in FIG. 1. FIG. 7 illustrates the states of the laser beam 55 and the wire 5 when the end portion 54 of the bead 50 is formed. "M1", "M2", and "M3" illustrated in FIG. 7 illustrate the states at time M1, time M2, and time M3, respectively in FIG. 6.

The deceleration of the movement of the machining head 10 in the X-axis direction is started at time M1. In addition, at time M1, the lowering of the output of the laser beam 55 is started. At time M1, the velocity at which the machining head 10 moves is F1, and the output of the laser beam 55 is P1. In addition, the deceleration of the velocity at which the wire 5 is fed is started at time M1. At time M1, the velocity at which the wire 5 is fed is V1. At time M1, the molten pool 53 is formed around the center of an XY cross section of the laser beam 55. In the molten pool 53, the wire 5 and the bead 50 are molten and integrated with each other. The leading end 5a of the wire 5 is in the molten bead 50. Note that the boundary between the wire 5 and the bead 50 may not be clear. In FIG. 7, the boundary between the wire 5 and the bead 50 is schematically expressed by a broken line.

At time M2, the feeding of the wire 5 is stopped. At time M2, the output of the laser beam 55 is an output lower than P1. Because the irradiation with the laser beam 55 is continued, the portion of the wire 5 irradiated with the laser beam 55 is molten. At time M2, while the machining head 10 moves at a velocity lower than F1, the wire 5 is decelerated to zero velocity. At time M2, because the relation between the velocity at which the machining head 10 moves and the velocity at which the wire 5 is fed has changed from that at time M1, the position of the leading end 5a relative to the irradiation area of the laser beam 55 is moved back toward the wire spool 6 from that at time M1. Thus, the position of the leading end 5a is a position around an upper end of the molten pool 53. At time M2, the wire 5 can be said to be in contact with the upper end of the molten pool 53. Furthermore, at time M2, the pulling-back of the wire 5 is started. Thus, at time M2, the rotary motor 4 switches from the first driving to the second driving.

Because the pulling-back of the wire 5 is started from the state where the wires is in contact with the upper end of the molten pool 53, the additive manufacturing apparatus 100 can reduce the material that adheres to wire 5 from the molten pool 53 as compared with a case where the wire 5 is pulled back from deep inside the molten pool 53. As a result, the additive manufacturing apparatus 100 can reduce deterioration in the accuracy of the shape at the end portion 54. In addition, the additive manufacturing apparatus 100 can reduce formation of a lump at the leading end 5a.

At time M3, which is a second time point, the output of the laser beam 55 is stopped. In addition, at time M3, the movement of the machining head 10 is stopped. Between time M2 and time M3, the wire 5 is pulled back and the machining head 10 moves while continuing decelerating, and thus the position of the leading end 5a is further moved back from that at time M2. As a result, the position of the leading end 5a is a position outside of the irradiation area of the laser beam 55. At time M3, the rotary motor 4 moves the leading end 5a of the wire 5 to outside of the irradiation area of the laser beam 55. Note that, because the irradiation with the laser beam 55 is stopped at time M3, the irradiation area at time M3 refers to the irradiation area until immediately before time M3. In FIG. 7, the laser beam 55 which has been output until immediately before time M3 is illustrated by a broken line. After the wire 5 is pulled back until the leading end 5a is moved back to outside of the irradiation area of the laser beam 55, the pulling-back of the wire 5 is stopped at time M4.

For the above-described operation, the output command generating unit 27 generates an output command for starting lowering of the output of the laser beam 55 at the first time point concurrently with the start of deceleration of the machining head 10, and stopping the output of the laser beam 55 at the second time point concurrently with the stop of the machining head 10. The supply command generating unit 28 generates a supply command for causing deceleration of the feeding of the wire 5 at the first time point, and switching from the feeding of the wire 5 to the pulling-back of the wire 5 at the third time point between the first time point and the second time point.

According to the first embodiment, the additive manufacturing apparatus 100 stops feeding the wire 5 and starts pulling back the wire 5 at time M2 in a period in which output of the laser beam 55 is being lowered. The additive manufacturing apparatus 100 starts the pulling-back of the wire 5 while the irradiation with the laser beam 55 is continued, which can reduce formation of a lump due to the first cause described above. The additive manufacturing apparatus 100 pulls back the wire 5 from the state in which the leading end 5a is moved back to the upper end of the bead 50 at time M2, which can shorten the time during which the wire 5 is continuously irradiated with the laser beam 55. As a result, the additive manufacturing apparatus 100 can reduce formation of a lump due to the second cause described above. Furthermore, the additive manufacturing apparatus 100 stops the feeding of the wire 5 before the irradiation with the laser beam 55 is stopped, which can also reduce adhesion of the wire 5 to the bead 50.

The rotary motor 4 performs the second driving of causing the velocity of the pulling-back of the wire 5 to accelerate from time M2, so that the leading end 5a of the wire 5 can be moved back from the irradiation area of the laser beam 55 in a short time. As a result, the additive manufacturing apparatus 100 can further reduce formation of a lump due to the second cause described above. Alternatively, the rotary motor 4 may perform the second driving in which the wire 5 is pulled back at a constant velocity.

Figure 8:
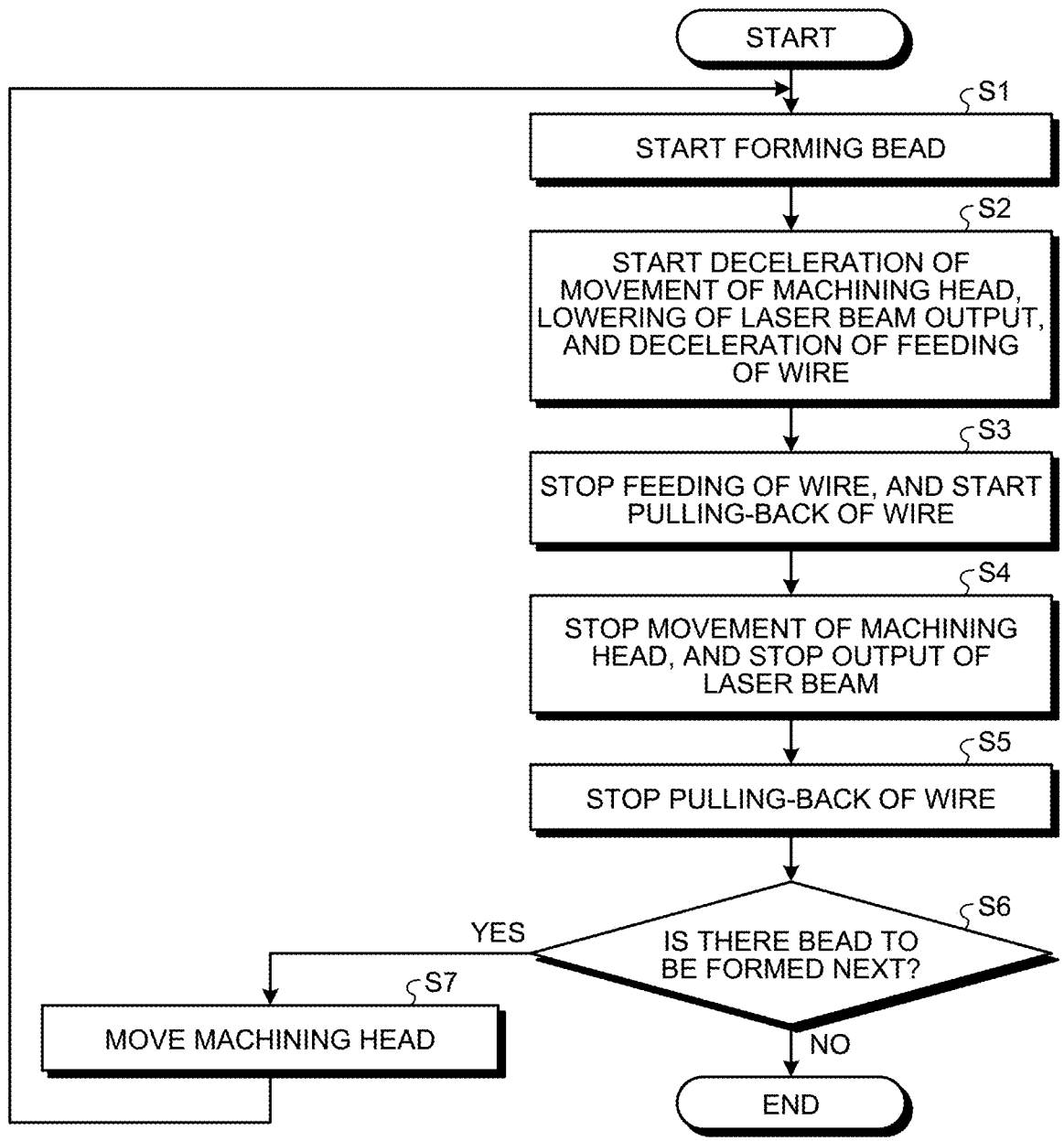
FIG. 8 is a flowchart illustrating procedures of operation performed by the additive manufacturing apparatus according to the first embodiment.

FIG. 8 is a flowchart illustrating procedures of the operation performed by the additive manufacturing apparatus 100 according to the first embodiment. In step S1, the additive manufacturing apparatus 100 starts forming a bead 50 at the start point 51 illustrated in FIG. 6.

In step S2, the additive manufacturing apparatus 100 starts deceleration of the movement of the machining head 10, lowering of the output of the laser beam 55, and deceleration of the feeding of the wire 5. Step S2 is a process at time M1 described above.

In step S3, the additive manufacturing apparatus 100 switches from the first driving to the second driving at the rotary motor 4 to stop feeding of the wire 5 and start pulling-back of the wire 5. Step S3 is a process at time M2 described above.

In step S4, the additive manufacturing apparatus 100 stops the movement of the machining head 10, and stops the output of the laser beam 55. Step S4 is a process at time M3 described above. The additive manufacturing apparatus 100 terminates the formation of one bead 50 by step S4. In step S5, the rotary motor 4 stops the second driving so that the additive manufacturing apparatus 100 stop the pulling-back of the wire 5. Step S5 is a process at time M4 described above.

In step S6, the additive manufacturing apparatus 100 determines whether or not there is a bead 50 to be formed next. If there is a bead 50 to be formed next (step S6, Yes), the additive manufacturing apparatus 100 moves the machining head 10 to a position that is a start point 51 of the bead 50 to be formed next in accordance with the machining program 20 in step S7. The additive manufacturing apparatus 100 repeats the procedures from step S1 for the bead 50 to be formed next. If there is no bead 50 to be formed next (step S6, No), the additive manufacturing apparatus 100 terminates the operation by the procedures illustrated in FIG. 8.

According to the first embodiment, the additive manufacturing apparatus 100 switches from the first driving to the second driving at the time point between the time point when the beam source starts lowering the output and the time point when the beam source stops the output, on the basis of the machining program. Because separation of the wire 5 from the object to be machined is started at the time point between the time point when the beam source starts lowering the output and the time point when the beam source stops the output, the additive manufacturing apparatus 100 can reduce adhesion of the wire 5 to the bead 50 and reduce formation of a lump at the leading end 5a of the wire 5. The additive manufacturing apparatus 100 can reduce lowering of the machining quality due to the adhesion of the wire 5 and the formation of a lump. As a result, the additive manufacturing apparatus 100 produces an effect of enabling improvement in the machining quality.

Note that, in the first embodiment, the beam may be a beam other than a laser beam, and may be an electron beam. The additive manufacturing apparatus 100 may include an electron beam generation source that is a beam source. The NC device 1 can improve the machining quality even when the beam is a beam other than a laser beam.

Second Embodiment

Figure 9:
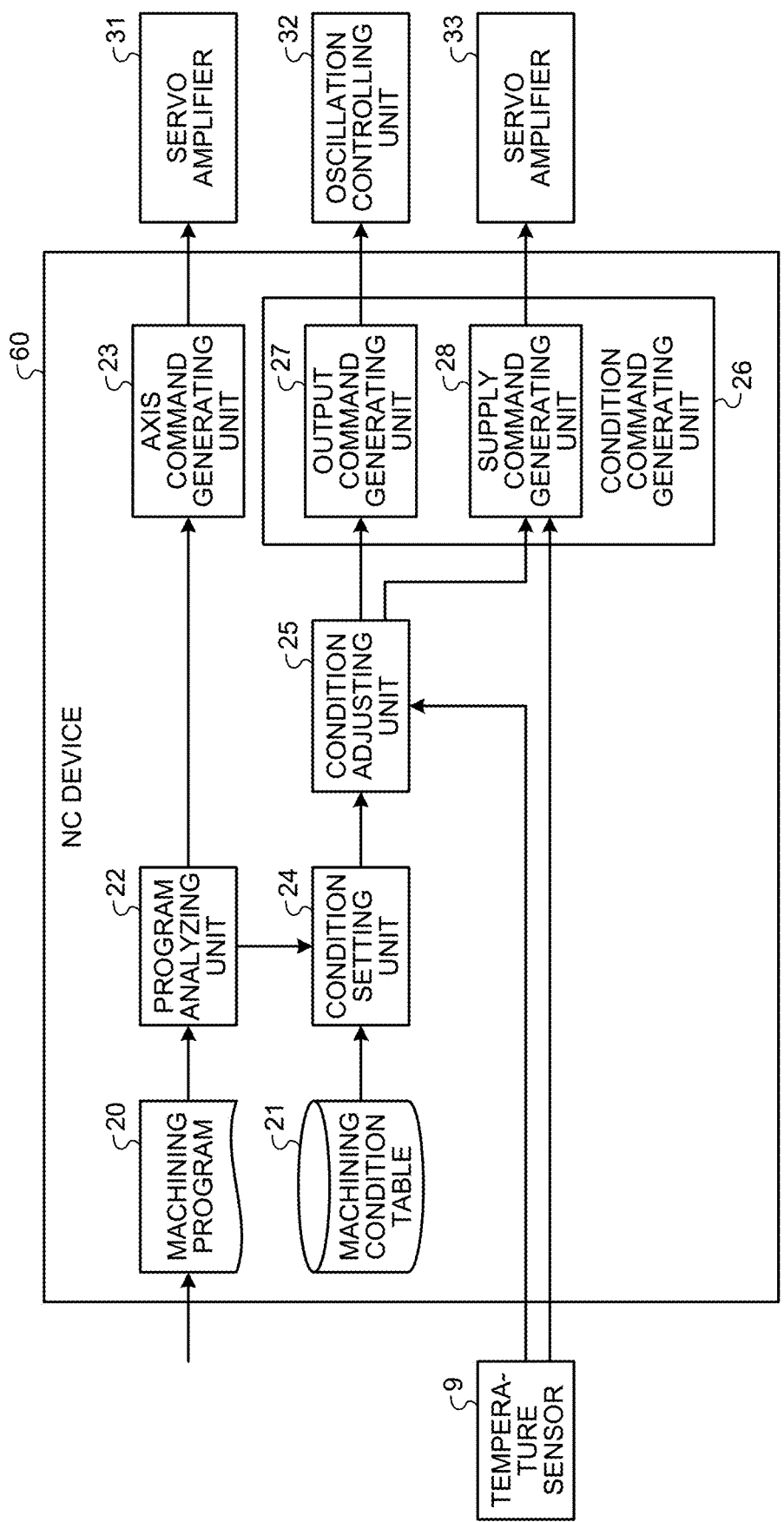
FIG. 9 is a diagram illustrating a functional configuration of an NC device that controls an additive manufacturing apparatus according to a second embodiment of the present invention.

FIG. 9 is a diagram illustrating a functional configuration of an NC device 60 that controls an additive manufacturing apparatus 100 according to a second embodiment of the present invention. The additive manufacturing apparatus 100 according to the second embodiment adjusts the time point when the driving unit switches from the first driving to the second driving, on the basis of the temperature of the object to be machined. In the second embodiment, components that are the same as those in the first embodiment described above will be represented by the same reference numerals, and features different from those in the first embodiment will be mainly described.

The signal from the temperature sensor 9 is input to the supply command generating unit 28. The supply command generating unit 28 adjusts the third time point at which the switching from the first driving to the second driving is performed on the basis of the temperature of the object to be machined, by adjusting the third time point on the basis of the detection result from the temperature sensor 9. FIG. 9 is the same as FIG. 2 except that an arrow indicating transmission of a signal from the temperature sensor 9 to the supply command generating unit 28 is added.

Figure 10:
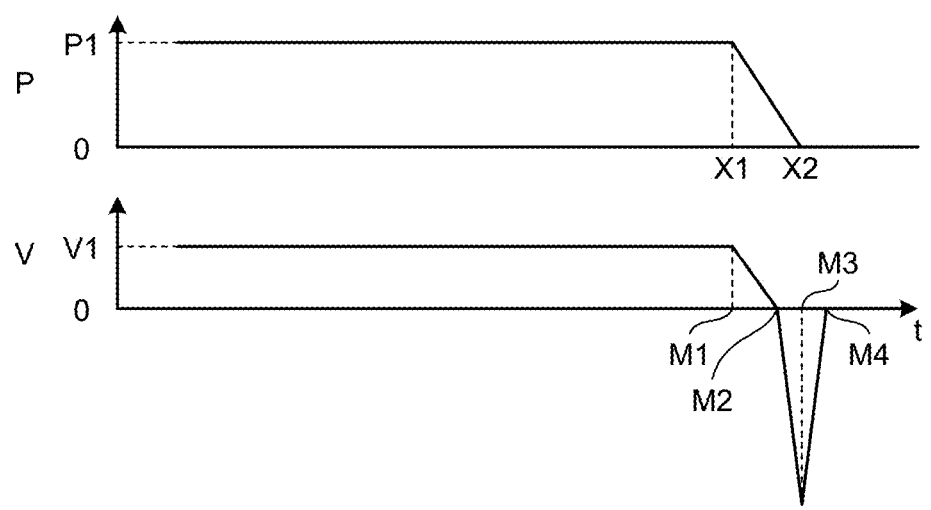
FIG. 10 is a diagram illustrating operation of the additive manufacturing apparatus according to the second embodiment.

FIG. 10 is a diagram illustrating operation performed by the additive manufacturing apparatus 100 according to the second embodiment. FIG. 10 illustrates changes in the output of the laser beam 55 and the velocity of the wire 5 when the formation of the bead 50 is stopped. In the second embodiment, time X1 represents the first time point at which the laser oscillator 2 starts lowering of the output from P1. Time X2 is the second time point when the output of the laser beam 55 is stopped. Time M1 is the time point when deceleration of the feeding of the wire 5 is started. Time M2 is the third time point when the feeding of the wire 5 is stopped and the pulling-back of the wire 5 is started. Time M3 is the time point when the position of the leading end 5a of the wire 5 comes outside the irradiation area of the laser beam 55. Time M4 is the time point when the pulling-back of the wire 5 is stopped. FIG. 6 described above illustrates the operation in a case where time X1 coincides with time M1 and time X2 coincides with time M3. The operation in such a case will be referred to as reference operation in the following description. In addition, the temperature detected by the temperature sensor 9 in the case where a bead 50 can be formed by the reference operation without causing adhesion of the wire 5 to the bead 50 and formation of a lump at the leading end 5a, will be referred to as a reference temperature.

As the temperature detected by the temperature sensor 9 is higher than the reference temperature, the wire 5 is more easily separated from the bead 50 when the wire 5 is pulled back and the quantity of heat received by the wire 5 is larger. When the detected temperature is higher than the reference temperature, the supply command generating unit 28 performs adjustment to delay the third time point from that in the reference operation. The additive manufacturing apparatus 100 delays the third time point and the time point which is after the third time point and at which the position of the leading end 5a comes outside the irradiation area of the laser beam 55, so as to pull back the wire 5 in a state in which the output of the laser beam 55 is relatively lower. As a result, the additive manufacturing apparatus 100 reduces the quantity of heat applied to the leading end 5a of the wire 5 by the irradiation with the laser beam 55, which can reduce formation of a lump due to the second cause described above. When the detected temperature is higher than the reference temperature, the supply command generating unit 28 may perform adjustment to delay the time point when the deceleration of the feeding of the wire 5 is started, from time X1. As a result, the additive manufacturing apparatus 100 can delay the time point at which the deceleration of the feeding of the wire 5 is started, the third time point, and the time point at which the position of the leading end 5a comes outside the irradiation area of the laser beam 55.

As the temperature detected by the temperature sensor 9 is lower than the reference temperature, the wire 5 becomes more likely to adhere to the bead 50 when the wire 5 is pulled back and the quantity of heat received by the wire 5 is smaller. When the detected temperature becomes lower than the reference temperature, the supply command generating unit 28 performs adjustment to make the third time point earlier than that in the reference operation. The additive manufacturing apparatus 100 brings forward the third time point and the time point which is after the third time point and at which the position of the leading end 5a comes outside the irradiation area of the laser beam 55, so as to pull back the wire 5 in a state in which the output of the laser beam 55 is relatively higher. As a result, the additive manufacturing apparatus 100 increases the quantity of heat applied to the wire 5 by the irradiation of the laser beam 55, which can reduce adhesion of the wire 5 to the bead 50. When the detected temperature is lower than the reference temperature, the supply command generating unit 28 may perform adjustment to make the time point when the deceleration of the feeding of the wire 5 is started, earlier than time X1. As a result, the additive manufacturing apparatus 100 can bring forward the time point at which the deceleration of the feeding of the wire 5 is started, the third time point, and the time point at which the position of the leading end 5a comes outside the irradiation area of the laser beam 55. Furthermore, the supply command generating unit 28 may perform adjustment to make the third time point earlier than time X1 depending on the degree by which the detected temperature is lowered.

The additive manufacturing apparatus 100 may adjust the third time point on the basis of the temperature by adjustment performed by the output command generating unit 27, instead of the adjustment performed by the supply command generating unit 28. The additive manufacturing apparatus 100 can adjust the third time point relative to the first time point and the second time point, by adjusting the time point when lowering of the laser output from P1 is started and the time point when the laser output is stopped.

The additive manufacturing apparatus 100 may perform adjustment of the third time point based on the temperature of the object to be machined, by detecting the temperature of the object to be machined on the basis of image data from the camera 19. In a case where the detection result from the temperature sensor 9 is used and a case where the image data from the camera 19 is used for the adjustment, the additive manufacturing apparatus 100 can adjust the third time point with use of an existing configuration. The additive manufacturing apparatus 100 can reduce the number of components as compared with a case where a configuration for the adjustment of the third time point is additionally needed. Alternatively, the additive manufacturing apparatus 100 may perform the adjustment by using a configuration other than the temperature sensor 9 or the camera 19. Such a configuration may be used only for the adjustment of the third time point.

The additive manufacturing apparatus 100 may adjust the third time point on the basis of a result of estimation of the temperature of the object to be machined, in addition to adjustment of the third time point on the basis of a temperature detection result. The additive manufacturing apparatus 100 may hold in advance information indicating the relation between the number of beads 50 to be deposited and the temperature of the deposits 18, and adjust the third time point on the basis of an estimation result obtained from such information.

According to the second embodiment, the additive manufacturing apparatus 100 adjusts the time point at which the driving unit switches from the first driving to the second driving on the basis of the temperature of the object to be machined including the molten pool 53, which can reduce adhesion of the wire 5 to the bead 50 and formation of a lump at the leading end 5a of the wire 5. The additive manufacturing apparatus 100 can reduce lowering of the machining quality due to the adhesion of the wire 5 and the formation of a lump. As a result, the additive manufacturing apparatus 100 produces an effect of enabling improvement in the machining quality.

Third Embodiment

Figure 11:
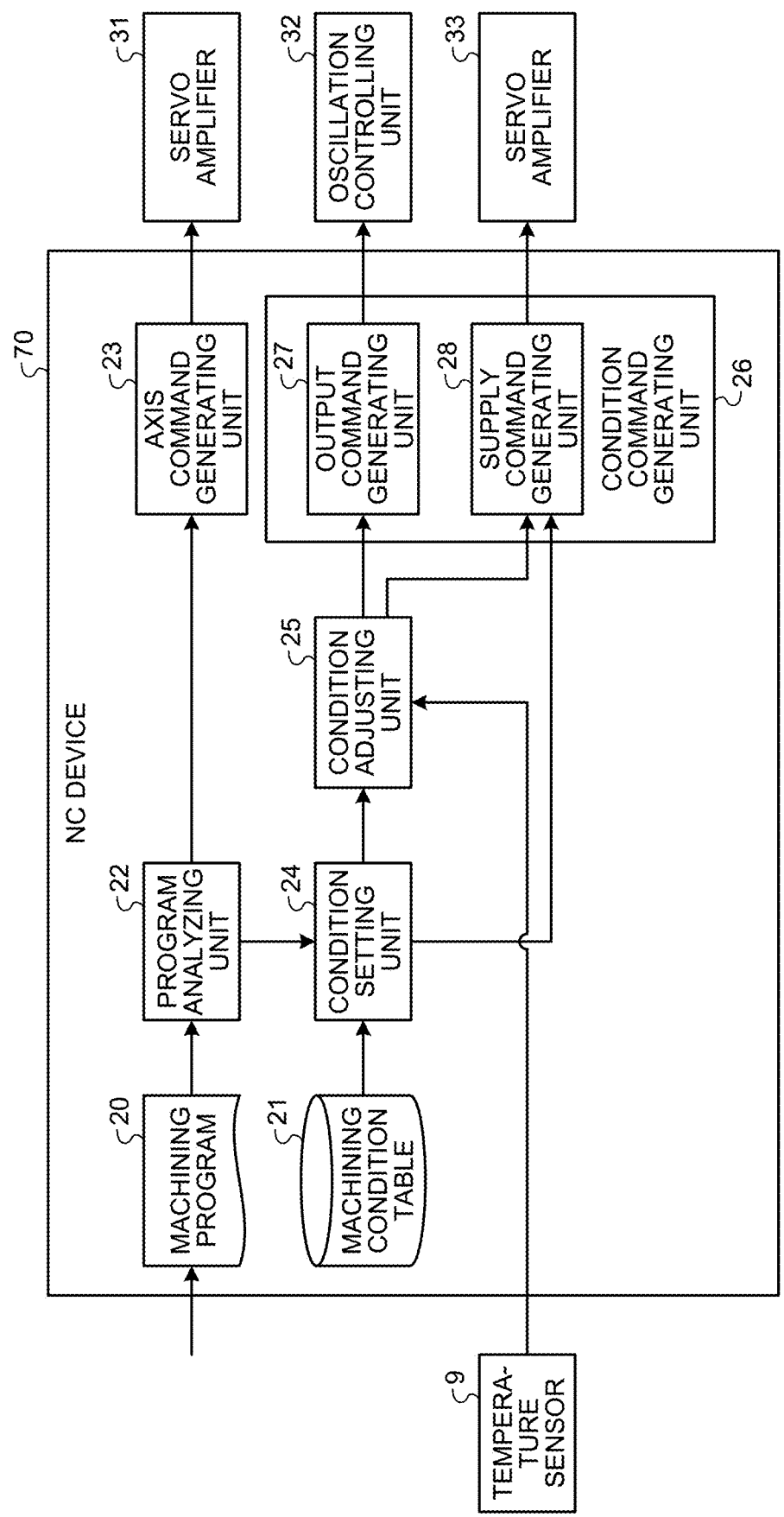
FIG. 11 is a diagram illustrating a functional configuration of an NC device that controls an additive manufacturing apparatus according to a third embodiment of the present invention.

FIG. 11 is a diagram illustrating a functional configuration of an NC device 70 that controls an additive manufacturing apparatus 100 according to a third embodiment of the present invention. The additive manufacturing apparatus 100 according to the third embodiment adjusts the time point when the driving unit switches from the first driving to the second driving on the basis of the machining condition. In the third embodiment, components that are the same as those in the first and second embodiments described above will be represented by the same reference numerals, and features different from those in the first and second embodiments will be mainly described.

The condition setting unit 24 outputs data of a machining condition to the supply command generating unit 28. The supply command generating unit 28 adjusts the third time point when switching from the first driving to the second driving is performed, on the basis of the machining condition. FIG. 11 is the same as FIG. 2 except that an arrow indicating transmission of data from the condition setting unit 24 to the supply command generating unit 28 is added.

The change in the output P and the change in the velocity V in the third embodiment are similar to the change in the output P and the change in the velocity V in the second embodiment illustrated in FIG. 10, respectively. Here, the relation between the change in the output of the laser beam 55 and the change in the velocity of the wire 5 in the third embodiment will be explained with reference to FIG. 10. In the following description, the machining condition under which a bead 50 can be formed by the reference operation without causing adhesion of the wire 5 to the bead 50 and without formation of a lump at the leading end 5a of the wire 5, will be referred to as a reference machining condition.

In a case where a wire 5 having a lower melting point than that of the wire 5 under the reference machining condition is used, the wire 5 is molten by a smaller quantity of heat as the wire has a lower melting point. In addition, in a case where a wire 5 thinner than the wire 5 under the reference machining condition is used, the wire 5 is molten by a smaller quantity of heat as the diameter of the wire 5 is smaller. In a case where a wire 5 that is more easily molten than that under the reference machining condition is used, the supply command generating unit 28 performs adjustment similar to that in the case where the temperature of the object being machined is higher than the reference temperature, among the adjustments in the second embodiment described above. In contrast, in a case where a wire 5 having a higher melting point than that of the wire 5 under the reference machining condition or a wire 5 thicker than the wire 5 under the reference machining condition is used, the wire 5 is less easily molten than that under the reference machining condition. In a case where a wire 5 that is less easily molten than that under the reference machining condition is used, the supply command generating unit 28 performs adjustment similar to that in the case where the temperature of the object being machined is lower than the reference temperature among the adjustments in the second embodiment described above.

In a case where a laser beam 55 having a smaller beam diameter than that of the laser beam 55 under the reference machining condition is used for machining, or in a case where a laser beam 55 with a lower output than that of the laser beam 55 under the reference machining condition is used for machining, the wire 5 is less easily molten under the reference machining condition. In this case as well, the supply command generating unit 28 performs adjustment similar to that in the case where the temperature of the object being machined is lower than the reference temperature, among the adjustments in the second embodiment described above. In contrast, in a case where a laser beam 55 having a beam diameter larger than that of the laser beam 55 under the reference machining condition is used for machining, or in a case where a laser beam 55 with a higher output than that of the laser beam 55 under the reference machining condition is used for machining, the supply command generating unit 28 performs adjustment similar to that in the case where the temperature of the object being machined is higher than the reference temperature, among the adjustments in the second embodiment described above. As a result, the additive manufacturing apparatus 100 can reduce adhesion of the wire 5 and formation of a lump at the leading end 5a of the wire 5 in a manner similar to the second embodiment.

In addition, the additive manufacturing apparatus 100 may adjust the third time point on the basis of the number of deposited beads 50. When a bead 50 on the first layer is formed, the temperature of the bead 50 being formed is easily lowered by heat loss from the bead 50 to the base material 17. When a bead 50 on the second or subsequent layer is formed under the same machining condition as that for the first layer, the heat is less easily lost from the deposits 18 as the number of deposited beads 50 is larger. In this case, because the heat storage in the deposits 18 is larger, the temperature of a bead 50 being formed is less easily lowered. Because the wire 5 is more easily molten as the number of deposited beads 50 is larger, the additive manufacturing apparatus 100 performs adjustment to further delay the third time point as the number of deposited beads 50 is larger. As a result, the additive manufacturing apparatus 100 can reduce formation of a lump at the leading end 5a of the wire 5 in a manner similar to the second embodiment.

Alternatively, the additive manufacturing apparatus 100 may adjust the third time point on the basis of the machining condition by adjustment performed by the output command generating unit 27 instead of the adjustment performed by the supply command generating unit 28. The additive manufacturing apparatus 100 may perform the adjustment of the third time point based on the temperature of the object to be machined in a manner similar to the second embodiment in addition to the adjustment of the third time point based on the machining condition.

According to the third embodiment, the additive manufacturing apparatus 100 adjusts the time point at which the driving unit switches from the first driving to the second driving on the basis of the machining condition, which can reduce adhesion of the wire 5 to the bead 50 and formation of a lump at the leading end 5a of the wire 5 in a manner similar to the second embodiment. As a result, the additive manufacturing apparatus 100 produces an effect of enabling improvement in the machining quality.

Fourth Embodiment

Figure 12:
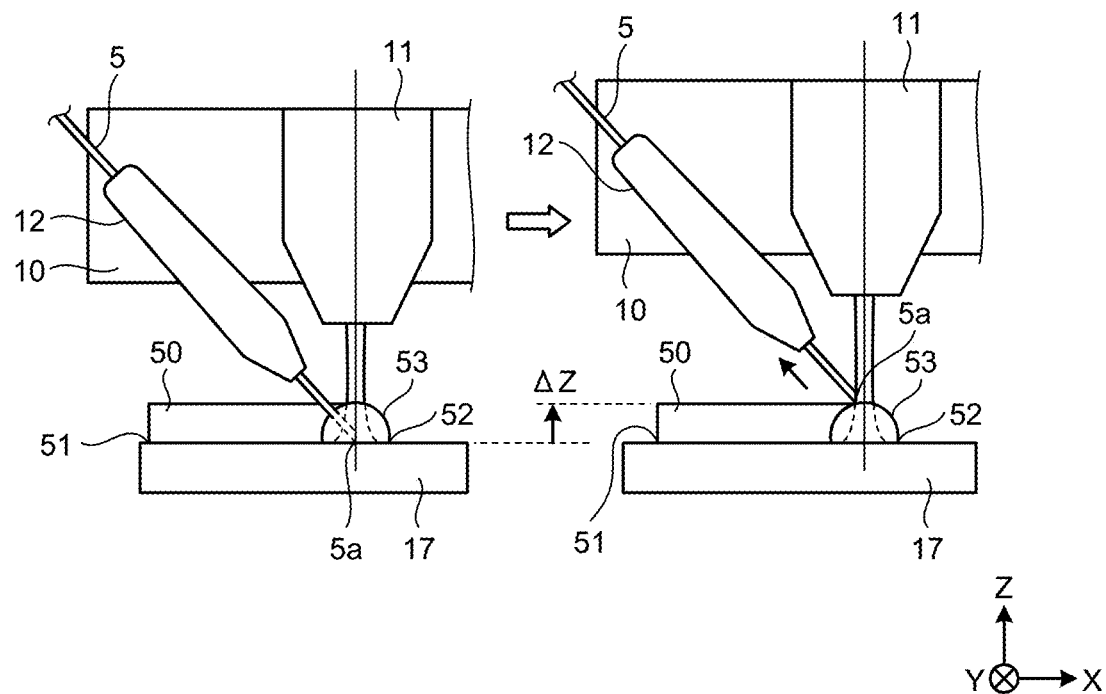
FIG. 12 is a diagram illustrating operation of an additive manufacturing apparatus according to a fourth embodiment of the present invention.

FIG. 12 is a diagram explaining operation of an additive manufacturing apparatus 100 according to a fourth embodiment of the present invention. The additive manufacturing apparatus 100 according to the fourth embodiment moves the machining head 10 in a direction away from the object being machined before the time point when the driving unit switches from the first driving to the second driving. In the fourth embodiment, components that are the same as those in the first to third embodiments described above will be represented by the same reference numerals, and features different from those in the first to third embodiments will be mainly described.

The change in the output P and the change in the velocity V in the fourth embodiment are similar to the change in the output P and the change in the velocity V in the second embodiment illustrated in FIG. 10. Here, operation of the machining head 10 will be explained with reference to FIG. 10. The movement of the machining head 10 in the direction away from the object being machined is performed at a fourth time point between time M1, which is a time point when deceleration of the feeding of the wire 5 is started, and time M2, which is the third time point when the feeding of the wire 5 is stopped and the pulling-back of the wire 5 is started. In FIG. 12, the direction away from the object being machined is the plus Z direction. The fourth time point may be at the same time as time M1. In addition, the fourth time point is before the third time point.

FIG. 12 illustrates a state before the machining head 10 is moved in the plus Z direction and a state after the machining head 10 is moved in the plus Z direction. Before the machining head 10 is moved, the leading end 5a of the wire 5 is deep inside the molten pool 53 in a manner similar to that in the state at time M1 illustrated in FIG. 7. At the fourth time point, the additive manufacturing apparatus 100 moves the machining head 10 from this state by a distance ΔZ in the plus Z direction. As a result, the position of the leading end 5a of the wire 5 is lifted with the movement of the machining head 10 by the distance ΔZ in the plus Z direction from the position during machining, and reaches a position around the upper end of the molten pool 53. For the above-described operation, the axis command generating unit 23 generates an axis command for moving the machining head 10 by the distance ΔZ in the plus Z direction at the fourth time point. The head driving unit 14 moves the machining head 10 in the direction away from the object being machined at the fourth time point in accordance with the axis command.

At the fourth time point, the wire 5 can be said to be in contact with the upper end of the molten pool 53. At time M2 after the fourth time point, the pulling-back of the wire 5 is started. Because the pulling-back of the wire 5 is started from the state where the wires is in contact with the upper end of the molten pool 53, the additive manufacturing apparatus 100 can reduce the material that adheres to wire 5 from the molten pool 53 as compared with a case where the wire 5 is pulled back from deep inside the molten pool 53. As a result, the additive manufacturing apparatus 100 can reduce deterioration in the accuracy of the shape at the end portion 54. In addition, the additive manufacturing apparatus 100 can reduce formation of a lump at the leading end 5a of the wire 5.

Note that the additive manufacturing apparatus 100 may perform the adjustment of the third time point based on the temperature of the object to be machined in a manner similar to the second embodiment. The additive manufacturing apparatus 100 may perform the adjustment of the third time point based on the machining condition in a manner similar to the third embodiment.

According to the fourth embodiment, the additive manufacturing apparatus 100 moves the machining head 10 in the direction away from the object being machined before the driving unit switches from the first driving to the second driving, which can reduce deterioration in the accuracy of the shape of the end portion 54. In addition, the additive manufacturing apparatus 100 can reduce formation of a lump at the leading end 5a of the wire 5. As a result, the additive manufacturing apparatus 100 produces an effect of enabling improvement in the machining quality.

Fifth Embodiment

Figure 13:
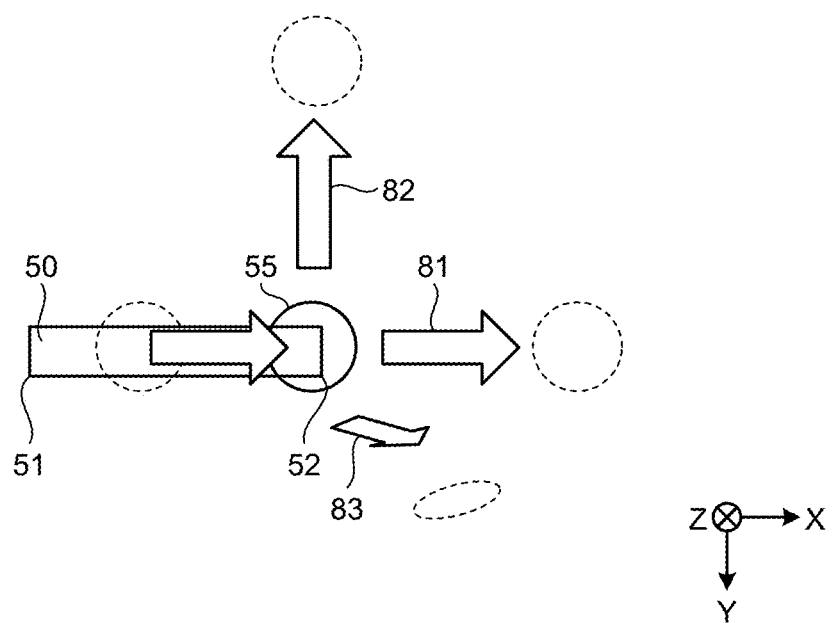
FIG. 13 is a diagram illustrating operation of an additive manufacturing apparatus according to a fifth embodiment of the present invention.

FIG. 13 is a diagram explaining operation of an additive manufacturing apparatus 100 according to a fifth embodiment of the present invention. The additive manufacturing apparatus 100 according to the fifth embodiment changes the position of the machining head 10 relative to the object to be machined by moving the machining head 10 or turning the object to be machined, at a position where application of the molten material is stopped. The position where application of the molten material is stopped, is a position of the end point 52 of a bead 50. In the fifth embodiment, components that are the same as those in the first to fourth embodiments described above will be represented by the same reference numerals, and features different from those in the first to fourth embodiments will be mainly described.

In FIG. 13, a first moving direction 81, which is the plus X direction, and a second moving direction 82, which is the minus Y direction, are examples of the direction in which the machining head 10 is moved when the machining head 10 has reached the position of the end point 52 of a bead 50. A turning direction 83 is an example of the direction in which the object to be machined is turned by the driving of the rotational driving unit 16 when the machining head 10 has reached the position of the end point 52 of a bead 50. The turning direction 83 is a direction in which the relative distance between the object to be machined and the leading end 5a becomes larger.

The change in the output P and the change in the velocity V in the fifth embodiment are similar to the change in the output P and the change in the velocity V in the second embodiment illustrated in FIG. 10. Here, the movement of the machining head 10 and the turning of the object to be machined will be explained with reference to FIG. 10. In a case where the direction in which the machining head 10 is moved is set in advance to the first moving direction 81, the machining head 10 moves in the plus X direction, which is the same direction as the moving direction during formation of the bead 50, at time M2. In a case where the direction in which the machining head 10 is moved is set in advance to the second moving direction 82, the machining head 10 stops moving in the plus X direction and starts moving in the minus Y direction at time M2.

For these operations, the axis command generating unit 23, which is a second command generating unit, generates an axis command for moving the machining head 10 in the preset direction at the position of the end point 52. The head driving unit 14 moves the machining head 10 in accordance with the axis command. As a result of the pulling-back of the wire 5 by the rotary motor 4 and the movement of the machining head 10, the leading end 5a is separated from the object being machined.

In a case where the direction in which the object being machined is turned is set in advance to the turning direction 83, the machining head 10 stops moving in the plus X direction. The rotational driving unit 16 turns the object being machined in the turning direction 83. For this operation, the axis command generating unit 23 generates a rotation command for turning the object being machined in the preset direction at the position of the end point 52. The rotational driving unit 16 turns the stage 15 in accordance with the rotation command. As a result of the pulling-back of the wire 5 by the rotary motor 4 and the turning of the object being machined, the leading end 5a is separated away from the object being machined.

The additive manufacturing apparatus 100 changes the position of the machining head 10 relative to the object being machined when the wire 5 is pulled back toward the wire spool 6. The additive manufacturing apparatus 100 can adjust the shape remaining at the end portion 54 of a bead 50 to a shape suitable for machining of a modeled article. As a result, the additive manufacturing apparatus 100 can improve the shape accuracy.

Note that the direction in which the machining head 10 is moved, and the direction in which the object being machined is turned are not limited to those illustrated in FIG. 13, and any direction may be set. The change in the position of the machining head 10 relative to the object being machined, need not be performed at the same time as switching from the first driving to the second driving performed by the driving unit. The additive manufacturing apparatus 100 may change the position of the machining head 10 relative to the object being machined before the switching, or may change the position of the machining head 10 relative to the object being machined after the switching.

The additive manufacturing apparatus 100 may perform the pulling-back of the wire 5 by the movement of the machining head 10 without performing the pulling-back of the wire 5 by the rotary motor 4. The pulling-back of the wire 5 by the movement of the machining head 10 refers to that the leading end 5a is relatively separated from the object being machined toward the wire spool 6 by the change in the position of the machining head 10 relative to the object being machined. In this case, the rotary motor 4 functions as a driving unit that performs the first driving for feeding the material toward the object being machined from a supply source. The head driving unit 14 functions as a driving unit that performs the second driving for pulling back the fed material toward the supply source. The rotary motor 4 and the head driving unit 14 switch from the first driving to the second driving on the basis of the machining program. The first driving refers to feeding the wire 5 from the wire spool 6 toward the object being machined by the rotary motor 4. The second driving refers to moving the machining head 10 by the head driving unit 14 to change the relative position described above. In this case as well, the additive manufacturing apparatus 100 can improve the shape accuracy and improve the machining quality.

The additive manufacturing apparatus 100 may perform the pulling-back of the wire 5 by turning the object being machined without performing the pulling-back of the wire 5 by the rotary motor 4. The pulling-back of the wire 5 by turning the object being machined, refers to that the leading end 5a is relatively separated from the object being machined toward the wire spool 6 by the change in the position of the machining head 10 relative to the object being machined. In this case, the rotary motor 4 functions as a driving unit that performs the first driving for feeding the material toward the object being machined from a supply source. The rotational driving unit 16 functions as a driving unit that performs the second driving for pulling back the fed material toward the supply source. The rotary motor 4 and the rotational driving unit 16 switch from the first driving to the second driving on the basis of the machining program. The first driving refers to feeding the wire 5 from the wire spool 6 toward the object being machined by the rotary motor 4. The second driving refers to turning the object being machined by the rotational driving unit 16 to change the relative position described above. In this case as well, the additive manufacturing apparatus 100 can improve the shape accuracy and improve the machining quality.

Note that the additive manufacturing apparatus 100 may perform the change in the relative position according to the fifth embodiment together with the movement of the machining head 10 in the plus Z direction according to the fourth embodiment. The additive manufacturing apparatus 100 may perform the adjustment of the third time point based on the temperature of the object being machined in a manner similar to the second embodiment. The additive manufacturing apparatus 100 may perform the adjustment of the third time point based on the machining condition in a manner similar to the third embodiment.

According to the fifth embodiment, the additive manufacturing apparatus 100 can improve the shape accuracy by changing the position of the machining head 10 relative to the object to be machined at the position where application of the molten material is stopped. As a result, the additive manufacturing apparatus 100 produces an effect of enabling improvement in the machining quality.

Sixth Embodiment

Figure 14:
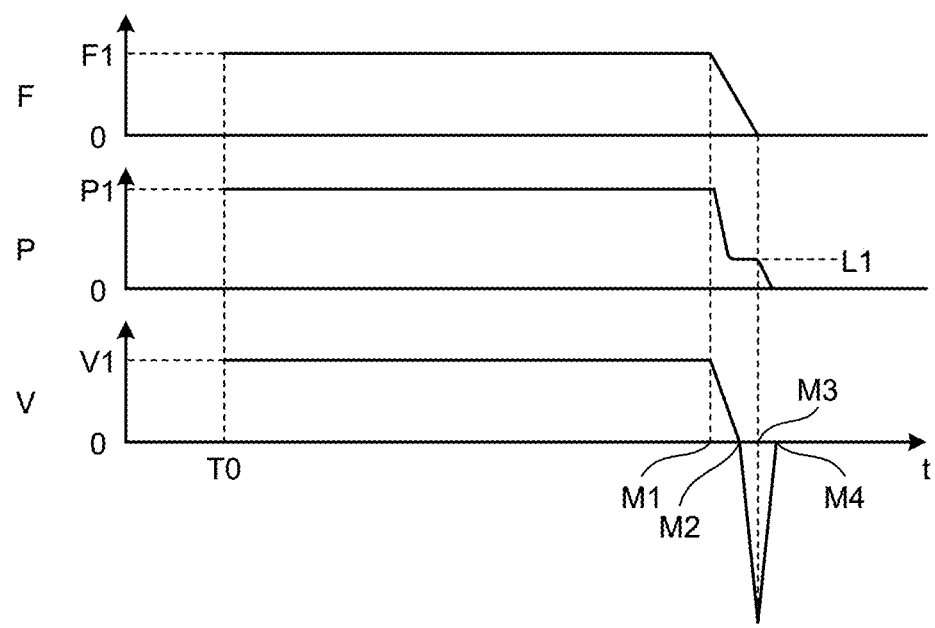
FIG. 14 is a diagram illustrating operation of an additive manufacturing apparatus according to a sixth embodiment of the present invention.

FIG. 14 is a diagram explaining operation of an additive manufacturing apparatus 100 according to a sixth embodiment of the present invention. The additive manufacturing apparatus 100 according to the sixth embodiment makes the output of the laser beam 55 constant during a period including the time point when the driving unit switches from the first driving to the second driving. In the sixth embodiment, components that are the same as those in the first to fifth embodiments described above will be represented by the same reference numerals, and features different from those in the first to fifth embodiments will be mainly described.

The lowering of the output of the laser beam 55 is started at time M1. The output of the laser beam 55 reaches L1, which is a preset output value, at a time point before time M2. L1 is an output value lower than P1 and higher than zero. The output of the laser beam 55 is maintained at L1 from the time point when the output reaches L1 until time M3. L1 is assumed to be an output value at which the molten state of the molten pool 53 can be kept in such a state in which the wire 5 can be pulled apart from a bead 50. The output of the laser beam 55 lowers again from time M3, and reaches zero. As described above, the additive manufacturing apparatus 100 makes the output of the laser beam 55 constant during the period including time M2, which is the third time point. For the above-described operation, the output command generating unit 27 generates an output command for making the output reach L1 before time M2 and maintaining the output at L1 until time M3.

The additive manufacturing apparatus 100 performs irradiation with the laser beam 55 at L1 during the period including the third time point, which enables pulling-back of the wire 5 from the molten pool 53 in the molten state. The additive manufacturing apparatus 100 maintains the molten pool 53 in the molten state, which can reduce adhesion of the wire 5 to the bead 50. Note that the additive manufacturing apparatus 100 only needs to maintain the molten pool 53 in the molten state while the wire 5 is pulled back, and the length of the period during which the output value is constant may be changed as appropriate. The additive manufacturing apparatus 100 may start lowering of the output from L1 at a time point before time M3. L1 may be set on the basis of a detection result of the temperature of the object being machined. L1 may be adjusted on the basis of the meltability of the wire 5.

Note that the additive manufacturing apparatus 100 may perform the adjustment of the third time point based on the temperature of the object to be machined in a manner similar to the second embodiment. The additive manufacturing apparatus 100 may perform the adjustment of the third time point based on the machining condition in a manner similar to the third embodiment. The additive manufacturing apparatus 100 may move the machining head 10 in a manner similar to the fourth embodiment. The additive manufacturing apparatus 100 may move the machining head 10 or turn the object to be machined in a manner similar to the fifth embodiment.

According to the sixth embodiment, the additive manufacturing apparatus 100 can reduce the adhesion of the wire 5 to the bead 50 by making the output of the laser beam 55 constant during the period including the time point when the driving unit switches from the first driving to the second driving. As a result, the additive manufacturing apparatus 100 produces an effect of enabling improvement in the machining quality.

The configurations presented in the above embodiments are examples of the present invention, and can be combined with other known technologies or can be partly omitted or modified without departing from the scope of the present invention.

REFERENCE SIGNS LIST 1, 60, 70 NC device; 2 laser oscillator; 3 fiber cable; 4 rotary motor; 5 wire; 5a leading end; 6 wire spool; 7 gas supplying device; 8 piping; 9 temperature sensor; 10 machining head; 11 beam nozzle; 12 wire nozzle; 14 head driving unit; 15 stage; 16 rotational driving unit; 17 base material; 18 deposits; 20 machining program; 21 machining condition table; 22 program analyzing unit; 23 axis command generating unit; 24 condition setting unit; 25 condition adjusting unit; 26 condition command generating unit; 27 output command generating unit; 28 supply command generating unit; 31, 33 servo amplifier; 32 oscillation controlling unit; 41 CPU; 42 RAM; 43 ROM; 44 external storage device; 45 input/output interface; 46 bus; 50 bead; 51 start point; 52 end point; 53 molten pool; 54 end portion; 55 laser beam; 81 first moving direction; 82 second moving direction; 83 turning direction; 100 additive manufacturing apparatus.

The invention claimed is:

1. An additive manufacturing apparatus for manufacturing a modeled object by applying a material molten by irradiation with a beam to an object to be machined, the additive manufacturing apparatus comprising:
a numerical control device comprising a processing circuitry;
a laser beam source configured to output the beam; and
a rotary motor configured to perform a first driving for feeding the material from a supply source of the material toward the object to be machined and a second driving for pulling back the fed material to the supply source by changing relative positions of the material fed from a supply source of the material and the object to be machined, wherein
the processing circuitry configured to control the laser beam source to start lowering a beam output from an output value in accordance with a machining condition at a first time point, control the laser beam source to stop outputting the beam as a result of lowering the beam output at a second time point, and control the rotary motor to switch from the first driving to the second driving at a third time point between the first time point and the second time point, and
the processing circuitry configured to lower the beam output to a predetermined output level during a period that comes after the first time point and includes the third time point, and maintain the predetermined output level until the third time point, wherein the predetermined output level has a sufficient power to enable a molten pool of the object to be machined and the material molten to be formed on the object to be machined.

2. The additive manufacturing apparatus according to claim 1, wherein the processing circuitry causes the driver to move the material to outside an area irradiated with the beam at the second time point.

3. The additive manufacturing apparatus according to claim 1, further comprising a temperature sensor to detect a temperature of the object to be machined, and wherein
the processing circuitry adjusts the third time point on the basis of a temperature detection result of the object to be machined.

4. The additive manufacturing apparatus according to claim 1, wherein the processing circuitry adjusts the third time point on the basis of a machining condition.

5. The additive manufacturing apparatus according to claim 1, further comprising:
a machining head including a nozzle configured to advance the material fed from the supply source toward the object to be machined, and a nozzle configured to emit the beam toward the object to be machined; and
a head driver to move the machining head, wherein
the processing circuitry causes the head driver to move the machining head in a direction away from the object to be machined before the third time point.

6. The additive manufacturing apparatus according to claim 1, further comprising:
a machining head including a nozzle configured to advance the material fed from the supply source toward the object to be machined, and a nozzle configured to emit the beam toward the object to be machined, wherein
the processing circuitry causes the driver to change a position of the machining head relative to the object to be machined at a position where application of the molten material is stopped.

7. The additive manufacturing apparatus according to claim 6, wherein the driver includes a head driver configured to move the machining head.

8. The additive manufacturing apparatus according to claim 6, wherein the driver includes a rotational driver configured to turn the object to be machined.

9. The additive manufacturing apparatus according to claim 1, further comprising:
a machining head including a nozzle configured to advance the material fed from the supply source toward the object to be machined, and a nozzle configured to emit the beam toward the object to be machined, wherein
the driver starts deceleration of the machining head from a velocity value specified in a machining program at the first time point and stops movement of the machining head at the second time point.

* * * * *